(12) United States Patent
Raynel (10) Patent No.: US 11,926,799 B2
(45) Date of Patent: Mar. 12, 2024

(54) 2-ISO-ALKYL-2-(4-HYDROXYPHENYL) PROPANE DERIVATIVES USED AS EMULSION BREAKERS FOR CRUDE OIL

(71) Applicant: Saudi Arabian Oil Company, Dhahran (SA)

(72) Inventor: Guillaume Robert Jean-Francois Raynel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 184 days.

(21) Appl. No.: 17/550,353

(22) Filed: Dec. 14, 2021

(65) Prior Publication Data

US 2023/0183583 A1  Jun. 15, 2023

(51) Int. Cl.
*C10G 33/04* (2006.01)
*B01D 17/04* (2006.01)
(Continued)

(52) U.S. Cl.
CPC ........... *C10G 33/04* (2013.01); *B01D 17/047* (2013.01); *C08G 65/485* (2013.01); *C08G 81/00* (2013.01)

(58) Field of Classification Search
CPC .... C10G 33/04; B01D 17/047; C08G 65/485; C08G 81/00; C08G 65/2612
See application file for complete search history.

(56) References Cited

U.S. PATENT DOCUMENTS 2,221,518 A  11/1940  Jennings
2,383,674 A  8/1945  Osborne
(Continued)

FOREIGN PATENT DOCUMENTS

AU  2004204512  7/2004
AU  2016214075  8/2016
(Continued)

OTHER PUBLICATIONS

Bhattacharyya et al., Al-MCM-41 catalysed alkylation of phenol with methanol (Year: 2003).*
(Continued)

*Primary Examiner* — Randy Boyer
*Assistant Examiner* — Juan C Valencia
(74) *Attorney, Agent, or Firm* — Fish & Richardson P.C.

(57) ABSTRACT

This disclosure relates to demulsifying polymers of Formula (I):

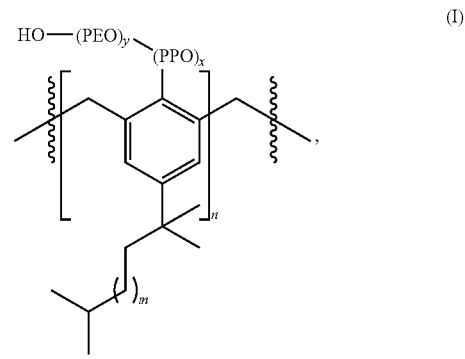

demulsifier compositions containing the compound of Formula (I), and methods of using the polymers and compositions for separating water-in-oil emulsions.

22 Claims, 1 Drawing Sheet

(51) Int. Cl.
*C08G 65/48* (2006.01)
*C08G 81/00* (2006.01)

(56) References Cited

U.S. PATENT DOCUMENTS

| | | | |
|---|---|---|---|
| 2,499,370 A | 3/1950 | De Groote et al. |
| 2,557,081 A | 6/1951 | De Groote et al. |
| 2,602,053 A | 7/1952 | De Groote et al. |
| 2,711,388 A | 6/1955 | Mottern et al. |
| 2,758,477 A | 8/1956 | Albert |
| 2,825,026 A | 2/1958 | Holaday et al. |
| 2,941,570 A | 6/1960 | Plym |
| 3,133,437 A | 5/1964 | Remke |
| 3,162,895 A | 12/1964 | Pusch |
| 3,222,918 A | 12/1965 | Kuntz |
| 3,462,596 A | 8/1969 | Saunders |
| 3,528,775 A | 9/1970 | Siegfriedt |
| 3,539,917 A | 11/1970 | Chleck |
| 3,546,926 A | 12/1970 | Dunavent, Jr. et al. |
| 3,553,576 A | 1/1971 | Petitjean |
| 3,684,735 A | 8/1972 | De Groote et al. |
| 3,727,049 A | 4/1973 | Saunders |
| 3,752,877 A | 8/1973 | Beavon |
| 3,778,706 A | 12/1973 | Thompson |
| 3,806,435 A | 4/1974 | Ohta |
| 3,899,913 A | 8/1975 | Schlosser et al. |
| 3,982,564 A | 9/1976 | Clabburn et al. |
| 3,984,906 A | 10/1976 | Schlosser et al. |
| 4,001,386 A | 1/1977 | Klein et al. |
| 4,034,219 A | 7/1977 | Louden et al. |
| 4,084,306 A | 4/1978 | Barker |
| 4,157,247 A | 6/1979 | Collins, III et al. |
| 4,178,358 A | 12/1979 | Smith et al. |
| 4,180,457 A | 12/1979 | Popp et al. |
| 4,253,928 A | 3/1981 | Blutas et al. |
| 4,301,400 A | 11/1981 | Paap |
| 4,428,839 A | 1/1984 | Davies et al. |
| 4,466,946 A | 8/1984 | Goddin, Jr. et al. |
| 4,481,130 A | 11/1984 | Robertson |
| 4,526,662 A | 7/1985 | Bylery et al. |
| 4,537,701 A | 8/1985 | Oppenlaender et al. |
| 4,543,191 A | 9/1985 | Stewart et al. |
| 4,581,134 A | 4/1986 | Richter, Jr. et al. |
| 4,589,896 A | 5/1986 | Chen et al. |
| 4,592,849 A | 6/1986 | McMillen |
| 4,627,458 A | 12/1986 | Prasad |
| 4,701,187 A | 10/1987 | Choe |
| 4,717,407 A | 1/1988 | Choe et al. |
| 4,737,265 A | 4/1988 | Merchant, Jr. et al. |
| 4,742,304 A | 5/1988 | Schnall et al. |
| 4,797,550 A | 1/1989 | Nelson et al. |
| 4,818,410 A | 4/1989 | Bellos et al. |
| 4,959,160 A | 9/1990 | Lake |
| 4,961,858 A | 10/1990 | Spei et al. |
| 4,995,952 A | 2/1991 | Dandapani et al. |
| 5,023,069 A | 6/1991 | Serrand |
| 5,035,065 A | 7/1991 | Parkinson |
| 5,067,345 A | 11/1991 | Mougne |
| 5,089,781 A | 2/1992 | Arichika et al. |
| 5,187,101 A | 2/1993 | Kato |
| 5,246,597 A | 9/1993 | Jenson et al. |
| 5,256,305 A | 10/1993 | Hart |
| 5,259,239 A | 11/1993 | Gaisford |
| 5,294,553 A | 3/1994 | Kawahara |
| 5,353,237 A | 10/1994 | Bass et al. |
| 5,381,002 A | 1/1995 | Morrow et al. |
| 5,401,300 A | 3/1995 | Lokhandwala et al. |
| 5,407,466 A | 4/1995 | Lokhandwala et al. |
| 5,407,467 A | 4/1995 | Lokhandwala et al. |
| 5,431,877 A | 7/1995 | Brucken et al. |
| 5,454,258 A | 10/1995 | Capuano |
| 5,531,865 A | 7/1996 | Cole |
| 5,632,803 A | 5/1997 | Stoner |
| 5,693,257 A | 12/1997 | Hart |
| 5,837,032 A | 11/1998 | Moll et al. |
| 5,885,424 A | 3/1999 | Davis et al. |
| 5,934,337 A | 8/1999 | Fiala et al. |
| 6,039,880 A | 3/2000 | Morataya |
| 6,096,239 A | 8/2000 | Fung et al. |
| 6,153,656 A | 11/2000 | Bourg |
| 6,168,702 B1 | 1/2001 | Varadaraj et al. |
| 6,179,900 B1 | 1/2001 | Behling et al. |
| 6,241,871 B1 | 6/2001 | Donini et al. |
| 6,361,582 B1 | 3/2002 | Pinnau et al. |
| 6,364,940 B1 | 4/2002 | Prueter et al. |
| 6,402,813 B2 | 6/2002 | Monereau et al. |
| 6,451,252 B1 | 9/2002 | Ruan et al. |
| 6,555,009 B2 | 4/2003 | Varadaraj |
| 6,614,242 B2 | 9/2003 | Matter et al. |
| 6,656,249 B1 | 12/2003 | Buisnnan |
| 6,896,717 B2 | 5/2005 | Pinnau et al. |
| 7,036,531 B2 | 5/2006 | Manini et al. |
| 7,306,735 B2 | 12/2007 | Baggott et al. |
| 7,393,427 B2 | 7/2008 | Bright et al. |
| 7,469,188 B2 | 12/2008 | Wee |
| 7,901,646 B2 | 3/2011 | Ayala et al. |
| 7,976,710 B2 | 7/2011 | Minhas et al. |
| 8,043,418 B2 | 10/2011 | Ruud et al. |
| 8,101,086 B2 | 1/2012 | Varadaraj et al. |
| 8,115,481 B2 | 2/2012 | Chen |
| 8,197,673 B2 | 6/2012 | Khan |
| 8,323,392 B2 | 12/2012 | Jones |
| 8,361,200 B2 | 1/2013 | Sayaryi et al. |
| 8,397,765 B2 | 3/2013 | Jackson et al. |
| 8,524,184 B2 | 9/2013 | Iyengar et al. |
| 8,551,199 B2 | 10/2013 | Thacker et al. |
| 8,685,236 B2 | 4/2014 | Miller |
| 8,716,689 B2 | 5/2014 | Chen et al. |
| 8,722,003 B1 | 5/2014 | Avagliano et al. |
| 8,790,509 B2 | 7/2014 | Vu |
| 8,805,587 B1 | 8/2014 | Elshafei et al. |
| 8,828,121 B1 | 9/2014 | He et al. |
| 9,092,124 B2 | 7/2015 | Amminudin et al. |
| 9,096,805 B2 | 8/2015 | Williams |
| 9,149,761 B2 | 10/2015 | Northrop et al. |
| 9,157,035 B1 | 10/2015 | Ball, IV et al. |
| 9,181,499 B2 | 11/2015 | Mason et al. |
| 9,244,017 B2 | 1/2016 | Cadieux et al. |
| 9,295,957 B2 | 5/2016 | Choi et al. |
| 9,399,866 B2 | 7/2016 | Alawadhi |
| 9,435,571 B2 | 9/2016 | Ghoshal et al. |
| 9,448,221 B2 | 9/2016 | Duval et al. |
| 9,493,712 B2 | 11/2016 | Barroeta et al. |
| 9,555,345 B2 | 1/2017 | Al-shafei et al. |
| 9,708,196 B2 | 7/2017 | Brenize et al. |
| 9,731,974 B2 | 8/2017 | Weiss et al. |
| 9,861,910 B2 | 1/2018 | Hammad et al. |
| 9,863,571 B2 | 1/2018 | Critsinelis et al. |
| 9,927,169 B2 | 3/2018 | Baker et al. |
| 9,943,802 B1 | 4/2018 | Ballaguet et al. |
| 10,024,835 B2 | 7/2018 | Sreekumar |
| 10,106,410 B2 | 10/2018 | Ballaguet et al. |
| 10,106,411 B2 | 10/2018 | Ballaguet et al. |
| 10,188,988 B2 | 1/2019 | Debrock et al. |
| 10,197,545 B2 | 2/2019 | Sreekumar et al. |
| 10,260,007 B2 | 4/2019 | Barroeta et al. |
| 10,260,010 B2 | 4/2019 | Soliman |
| 10,365,049 B2 | 7/2019 | Tso et al. |
| 10,386,284 B2 | 8/2019 | Zhang |
| 10,472,576 B2 | 11/2019 | Salu et al. |
| 10,479,684 B2 | 11/2019 | Ballaguet et al. |
| 10,508,033 B2 | 12/2019 | Ballaguet et al. |
| 10,513,663 B2 | 12/2019 | Soliman et al. |
| 10,589,223 B1 | 3/2020 | Raynel et al. |
| 10,662,061 B1 | 5/2020 | Lithoxoos et al. |
| 10,765,995 B2 | 9/2020 | Hamad et al. |
| 10,889,766 B2 | 1/2021 | Barreau et al. |
| 11,008,521 B1 | 5/2021 | Raynel et al. |
| 11,112,190 B2 | 9/2021 | Villette et al. |
| 11,131,660 B2 | 9/2021 | Ahmed et al. |
| 11,148,962 B2 | 10/2021 | Alghunaimi et al. |
| 11,247,919 B2 | 2/2022 | Raynel |
| 2003/0082096 A1 | 5/2003 | Lynn |
| 2003/0099594 A1 | 5/2003 | Lyon |

(56) References Cited

U.S. PATENT DOCUMENTS

| | | |
|---|---|---|
| 2005/0158235 A1 | 7/2005 | Ramani et al. |
| 2005/0217479 A1 | 10/2005 | Hale et al. |
| 2006/0186340 A1 | 8/2006 | Lievois |
| 2006/0231193 A1 | 10/2006 | Bright et al. |
| 2006/0286675 A1 | 12/2006 | Coleman |
| 2007/0183953 A1 | 8/2007 | Kerley et al. |
| 2009/0166028 A1 | 7/2009 | Varadaraj et al. |
| 2009/0179636 A1 | 7/2009 | Chen |
| 2009/0321323 A1 | 12/2009 | Sharma et al. |
| 2010/0260551 A1 | 10/2010 | Jespersen et al. |
| 2010/0264014 A1 | 10/2010 | Mignon et al. |
| 2011/0073206 A1 | 3/2011 | Na |
| 2011/0138854 A1 | 6/2011 | Huang et al. |
| 2011/0185896 A1 | 8/2011 | Sethna et al. |
| 2011/0194105 A1 | 8/2011 | LaFrancois et al. |
| 2011/0253598 A1 | 10/2011 | McDaniel et al. |
| 2011/0309463 A1 | 12/2011 | Kruglick |
| 2012/0012804 A1 | 1/2012 | Chen |
| 2012/0111051 A1 | 5/2012 | Kulkarni et al. |
| 2012/0168154 A1 | 7/2012 | Chinn et al. |
| 2012/0273367 A1 | 11/2012 | Themy et al. |
| 2012/0323059 A1 | 12/2012 | Liu et al. |
| 2013/0026082 A1 | 1/2013 | Al-Shafei et al. |
| 2013/0104772 A1 | 5/2013 | Schabron et al. |
| 2013/0110411 A1 | 5/2013 | Black et al. |
| 2013/0213892 A1 | 8/2013 | Henthorne et al. |
| 2013/0277551 A1 | 10/2013 | Bourrel et al. |
| 2014/0246382 A1 | 9/2014 | Matza et al. |
| 2014/0262953 A1 | 9/2014 | Ng et al. |
| 2014/0338395 A1 | 11/2014 | Oelfke et al. |
| 2015/0106027 A1 | 4/2015 | Koseoglu et al. |
| 2015/0136234 A1 | 5/2015 | Zulfiquar |
| 2015/0152340 A1 | 6/2015 | Cherney et al. |
| 2015/0175904 A1 | 6/2015 | Yeganeh et al. |
| 2015/0225655 A1 | 8/2015 | Adams et al. |
| 2015/0231555 A1 | 8/2015 | He et al. |
| 2015/0240717 A1 | 8/2015 | Starcher et al. |
| 2015/0267127 A1 | 9/2015 | Yeganeh et al. |
| 2015/0290575 A1 | 10/2015 | Rothermel et al. |
| 2015/0298972 A1 | 10/2015 | Ballaguet et al. |
| 2016/0018049 A1 | 1/2016 | Yodogawa et al. |
| 2016/0121258 A1 | 5/2016 | First |
| 2016/0195344 A1 | 7/2016 | Tomita et al. |
| 2016/0228813 A1 | 8/2016 | Schwartz |
| 2017/0045290 A1 | 2/2017 | Ploeger et al. |
| 2017/0190574 A1 | 7/2017 | Ercan et al. |
| 2017/0254793 A1 | 9/2017 | Al-Amri |
| 2017/0312682 A1 | 11/2017 | Keller |
| 2017/0319984 A1 | 11/2017 | Oshinowo |
| 2017/0320736 A1 | 11/2017 | Voss et al. |
| 2017/0369791 A1 | 12/2017 | Khan et al. |
| 2018/0031524 A1 | 2/2018 | Hassell |
| 2018/0066194 A1 | 3/2018 | Soliman et al. |
| 2018/0179097 A1 | 6/2018 | Navarro et al. |
| 2018/0187095 A1 | 7/2018 | Soliman |
| 2018/0195010 A1 | 7/2018 | Salu et al. |
| 2018/0202726 A1 | 7/2018 | Tso et al. |
| 2018/0216016 A1 | 8/2018 | Bakas et al. |
| 2018/0291282 A1 | 10/2018 | Soliman |
| 2018/0371876 A1 | 12/2018 | Lopez et al. |
| 2019/0010052 A1 | 1/2019 | Ballaguet et al. |
| 2019/0016598 A1 | 1/2019 | Ballaguet et al. |
| 2019/0027615 A1 | 1/2019 | Zheng et al. |
| 2019/0062645 A1 | 2/2019 | Al Seraihi et al. |
| 2019/0136113 A1 | 5/2019 | Holtsclaw et al. |
| 2019/0194526 A1 | 6/2019 | Holtsclaw et al. |
| 2019/0211274 A1 | 7/2019 | Soliman et al. |
| 2019/0227020 A1 | 7/2019 | Tamida et al. |
| 2019/0240613 A1 | 8/2019 | Raynel et al. |
| 2019/0247770 A1 | 8/2019 | Oshinowo |
| 2019/0353356 A1 | 11/2019 | Fischer |
| 2020/0023310 A1 | 1/2020 | Luo et al. |
| 2020/0028053 A1 | 1/2020 | Strano |
| 2020/0040263 A1 | 2/2020 | Khuzzan et al. |
| 2021/0031139 A1 | 2/2021 | Hamad et al. |
| 2021/0080446 A1 | 3/2021 | Ahmed |
| 2021/0172689 A1 | 6/2021 | Villette |
| 2021/0189260 A1 | 6/2021 | Robert |
| 2021/0363032 A1 | 11/2021 | Robert et al. |
| 2021/0395619 A1 | 12/2021 | Raynel et al. |
| 2021/0396731 A1 | 12/2021 | Duval et al. |
| 2022/0065384 A1 | 3/2022 | Villete et al. |
| 2022/0065386 A1 | 3/2022 | Villete et al. |
| 2022/0065402 A1 | 3/2022 | Villete et al. |

FOREIGN PATENT DOCUMENTS

| | | | |
|---|---|---|---|
| CA | 2735626 A1 * | 10/2011 | ........... B01D 17/047 |
| CA | 2968601 | 6/2016 | |
| CN | 1386563 | 12/2002 | |
| CN | 1844066 | 10/2006 | |
| CN | 101522595 | 9/2009 | |
| CN | 102085454 | 6/2011 | |
| CN | 103980950 | 8/2014 | |
| CN | 104001408 | 8/2014 | |
| CN | 104520411 | 4/2015 | |
| CN | 205534838 | 8/2016 | |
| CN | 105974098 | 9/2016 | |
| CN | 109696372 | 4/2019 | |
| CN | 109882683 | 6/2019 | |
| CN | 110127623 | 8/2019 | |
| CN | 110280941 | 9/2019 | |
| CN | 110711995 | 1/2020 | |
| CN | 111167317 | 5/2020 | |
| CN | 111365568 | 7/2020 | |
| DE | 102004010650 | 9/2005 | |
| EP | 0230683 | 8/1987 | |
| EP | 0195447 | 10/1989 | |
| EP | 0684066 | 11/1995 | |
| EP | 2932239 | 10/2015 | |
| EP | 3254010 | 12/2017 | |
| EP | 2932248 | 2/2020 | |
| FR | 2675709 | 10/1992 | |
| FR | 2676006 | 11/1992 | |
| GB | 1374010 | 11/1974 | |
| GB | 2336668 | 10/1999 | |
| JP | S56162001 | 12/1981 | |
| JP | S 6140555 | 2/1986 | |
| JP | 2001133450 | 5/2001 | |
| JP | 3764701 | 4/2006 | |
| KR | 20110134562 | 12/2011 | |
| KR | 101947311 | 5/2019 | |
| KR | 102128754 | 7/2020 | |
| SU | 1183890 | 10/1985 | |
| TW | I579034 | 4/2017 | |
| WO | WO 1993025636 | 12/1993 | |
| WO | WO 2004022796 | 3/2004 | |
| WO | WO 2005037883 | 4/2005 | |
| WO | WO 2008036910 | 3/2008 | |
| WO | WO-2008036910 A2 * | 3/2008 | ........... B01D 17/045 |
| WO | WO 2009111008 | 9/2009 | |
| WO | WO 2010133315 | 11/2010 | |
| WO | WO 2011069192 | 6/2011 | |
| WO | WO 2014028193 | 2/2014 | |
| WO | WO 2015074739 | 5/2015 | |
| WO | WO 2016069722 | 5/2016 | |
| WO | WO 2016102568 | 6/2016 | |
| WO | WO 2017008748 | 1/2017 | |
| WO | WO 2017020919 | 2/2017 | |
| WO | WO 2017220655 | 12/2017 | |
| WO | WO 2018022756 | 2/2018 | |
| WO | WO 2018097718 | 5/2018 | |
| WO | WO 2018129228 | 7/2018 | |
| WO | WO 2018165512 | 9/2018 | |
| WO | WO 2018169903 | 9/2018 | |
| WO | WO 2018236644 | 12/2018 | |
| WO | WO 2013068320 | 5/2019 | |
| WO | WO 2019171409 | 9/2019 | |
| WO | WO 2020225060 | 11/2020 | |
| WO | WO 2020225061 | 11/2020 | |
| WO | WO 2020225062 | 11/2020 | |

(56) References Cited

FOREIGN PATENT DOCUMENTS

| WO | WO 2020225063 | 11/2020 |
|---|---|---|
| WO | WO 2021113572 | 6/2021 |

OTHER PUBLICATIONS

U.S. Appl. No. 16/704,973, filed Dec. 15, 2019, Villete et al.
U.S. Appl. No. 16/741,853, filed Jan. 24, 2020, Raynel et al.
U.S. Appl. No. 17/009,573, filed Sep. 1, 2020, Villete et al.
U.S. Appl. No. 17/009,579, filed Sep. 1, 2020, Villete et al.
U.S. Appl. No. 17/103,685, filed Nov. 24, 2020, Villete et al.
Abiev et al., "Non-thermal plasma for process and energy intensification in dry reforming of methane," Catalysts, Nov. 2020, 10:1358.
Abrams et al., "Use of seawater in flue gas desulfurization," JAPCA, 1988, 38:7 (969-974), 7 pages.
AlQahtani et al., "One-Step Low-Temperature Reduction of Sulfur Dioxide to Elemental Sulfur by Plasma-Enhanced Catalysis," ACS Catal., 2020, 10: 5272-5277, 6 pages.
AlQahtani et al., "Plasma-assisted catalytic reduction of SO2 to elemental sulfur: Influence of nonthermal plasma and temperature on iron sulfide catalyst," Journal of Catalysis, Nov. 2020, 391: 260-272, 13 pages.
Amo et al., "Low-Quality Natural Gas Sulfur Removal/Recovery," Membrane Technology and Research, DOE Report DE-AC21-92MC28133-01, Jan. 29, 1998, 107 pages.
An et al., "Synthesis and SO2 Absorption/Desorption Properties of Poly(1,1,3,3-tetramethylguanidine acrylate)," Macromolecules, Apr. 2007, 40:9 (3388-3393), 6 pages.
Andreasen et al., "Use of Seawater Scrubbing for SO2 Removal from Marine Engine Exhaust Gas," Energy & Fuels, 2007, 21:3274-3279, 6 pages.
Aschoundong et al., "Silane Modification of Cellulose Acetate Dense Films as Materials for Acid Gas Removal Macromolecules," American Chemical Society (ASC) Publications, Macromolecules 46:14 (5584-5594), Jul. 9, 2013, 11 pages.
ASTM "D 3921-85: Standard test method for oil and grease and petroleum hydrocarbons in water," 1985 (reapproved 1990), ASTM International, 5 pages.
ASTM "D 4281-95: Standard test method for oil and grease (fluorocarbon extractable substances) by gravimetric determination," An American Standard, 1995, reapproved 2005, 6 pages.
ASTM "D 7066-04, Standard test method for dimer/trimer of chlorotrifluoroethylene (S-316) recoverable oil and grease and nonpolar by Infrared determination," 2007, 9 pages.
Belov et al., "Gas transport and free vol. in hexafluoropropylene polymers," Journal of Membrane Science, Nov. 2011, 383, 8 pages.
Ben-Shebil, "Effect of heat of adsorption on the adsorptive drying of solvents at equilibrium in a packed bed of zeolite," Chemical Engineering Journal, Jul. 1999, 74:3 (197-204), 8 pages.
Bernardo et al., "Gas transport properties of Pebax/room temperature ionic liquid gel membranes" Separation and Purification Technology, Sep. 2012, 97: 73-82, 13 pages.
Bhide et al., "Hybrid processes for the removal of acid gases from natural gas," Journal of Membrane Science, Mar. 4, 1998, 140:1 (27-49), 2 pages, Abstract Only.
Bogaerts et al., "CO2 conversion by plasma technology: Insights from modeling the plasma chemistry and plasma reactor design," Plasma Sources Science and Technology, May 2017, 26:6 (063001), 35 pages.
Bogaerts et al., "Plasma-based conversion of CO2: Current status and future challenges," Faraday Discussions, 2015, 183:217-232, 16 pages.
Bothamley, "Quantifying Oil/water Separation Performance in Three-Phase Separators—Part 1," Mar. 22, 2017, Mark Bothamley Consulting LLC., 14 pages.
Chatterjee et al., "Poly(ether urethane) and poly(ether urethane urea) membranes with high $H_2S/CH_4$ selectivity," Journal of Membrane Science, Nov. 1997, 135:99 (99-106), 8 pages.
Chen et al., "High CO2 permeability of ceramic-carbonate dual-phase hollow fiber membrane at medium-high temperature," Journal of Membrane Science, Mar. 2020, 597:117770, 10 pages.
Christopoulos, "Reliable computations of knee point for a curve and introduction of a unit invariant estimation," National and Kapodistrian University of Athens, Dec. 2014, 9 pages.
Cirne et al., "Methods for Determination of Oil and Grease Contents in Wastewater from the Petroleum Industry," Chemistry and Chemical Technology, 2016, 10:4, 8 pages.
Cui et al., "Ultrahigh and Selective SO2 Uptake in Inorganic Anion-Pillared Hybrid Porous Materials," Advanced Materials, May 2017, 29:28 (1606929), 9 pages.
Curcio et al., "Hybrid nanofiltration-membrane crystallization system for the treatment of sulfate wastes," Journal of Membrane Science 2010, 360.1-2:2010 (493-498), 6 pages.
Dang et al., "Research on decomposition of hydrogen sulfide using non-thermal plasma with metal oxide catalysis," Energy Procedia, 2012, 16:856-862, 7 pages.
De Bie et al., "Fluid modeling of the conversion of methane into higher hydrocarbons in an atmospheric pressure dielectric barrier discharge," Plasma Processes and Polymers, 2011, 8:11 (1033-1058), 26 pages.
Delfino et al., "A simple and fast method to determine water content in biodiesel by electrochemical impedance spectroscopy," Talanta 2018, 179:753-759, 26 pages.
digitalrefining.com [online], "Labsorb: A regenerable wet scrubbing process for controlling SO2 emissions," Jan. 2001, retrieved on Jan. 11, 2022, retrieved from URL<https://www.digitalrefining.com/article/1000818/labsorb-a-regenerable-wet-scrubbing-process-for-controlling-so2-emissions#.Yd3Ha9HMKUk>, 2 pages.
Diomede et al., "Insight into CO dissociation in plasmas from numerical solution of a vibrational diffusion equation," J. Phys. Chem. C, Aug. 2017, 121:36 (19568-19576), 46 pages.
Elinoff et al., "Thermal diode can control direction of heat flow," Electronic Products Magazine, Apr. 2017, 2 pages.
EPA, "Method 1664, Revision A: N-Hexane Extractable Material (HEM; Oil and Grease) and Silica Gel Treated N-Hexane Extractable Material (SGT-HEM; Non-polar material) By Extraction and Gravimetry," United States Environmental Protection Agency, Office of Water, Washington D.C., EPA-821-R-98-002, PB99-121949, Feb. 1999, 28 pages.
EPA, "Method 1664, Revision B: n-Hexane Extractable Material (HEM; Oil and Grease) and Silica Gel Treated n-Hexane Extractable Material (SGT-HEM; Non-polar Material) by Extraction and Gravimetry," United States Environmental Protection, Office of Water Agency, Feb. 2010, 35 pages.
EPA, "Oil and Grease (Gravimetric, Separatory Funnel Extraction)," Method # 413.1, Storet No. 00556, Issued in 1974, Editorial revision 1978, Standard test method for oil and grease using gravimetric determination, approved for NPDES, 3 pages.
EPA, "Oil and Grease (Spectrophotometric, Infrared)," Method # 413.2, Storet No. 00560, Issued in 1974, Editorial revision 1978, Standard test method for Oil and grease analysis using Freon extraction and IR absorbance without the Freon extract being treated by silica gel, 3 pages.
EPA, "Petroleum Hydrocarbons (Spectrophotometric, Infrared)," Method # 418.1, Storet No. 45501, Issued in 1978, Petroleum Hydrocarbons, 3 pages.
Foruny, "Measuring Salinity in crude oils: Evaluation of methods and an improved performance," 2008, Fuel, 1241-1248, 8 pages.
Froschauer et al., "No Matter of Course: Ionic Liquids as SO2-Selective Gas Absorbers," Lenzinger Berichte, Jan. 2013, 91:30-43, 15 pages.
Gabrus et al., "Experimental studies on 3A and 4A zeolite molecular sieves regeneration in TSA process: Aliphatic alcohols dewatering-water desorption," Chemical Engineering Journal, Jan. 2015, 259: 232-242, 11 pages.
Glasoe et al., "Solubility of water and deuterium oxide in carbon tetrachloride, toluene, and cyclohexane at various temperatures," Journal of Chemical & Engineering Data, 1972, 17:1 (66-68), 3 pages.

(56) References Cited

OTHER PUBLICATIONS

Hasenberg, "Sulfur Dioxide," in G. Kreysa and M. Schutze, Corrosion Handbook, Sulfur Dioxide, sodium sulfate, 10:5-37. Weinheim: Wiley, May 2008, 21 pages.

Hatcher et al., "Sour water stripping Part 2: phenolic water," Digital Refining, Aug. 2014, 5 pages.

Heijkers et al., "Plasma-based CH4 conversion into higher hydrocarbons and H2: Modeling to reveal the reaction mechanisms of different plasma sources," Journal of Physical Chemistry, May 2020, 124:7016-7030, 15 pages.

Hibbard and Schalla, "NACA Research Memorandum: Solubility of Water in Hydrocarbons," National Advisory Committee for Aeronautics, Washington, Jul. 10, 1952, 27 pages.

Huang et al., "Facilitated separation of CO2 and SO2 through supported liquid membranes using carboxylate-based ionic liquids," Journal of Membrane Science, Dec. 2014, 471:227-236, 10 pages.

International Standard, "ISO 5667-3: Water quality—sampling—part 3: guidance on the preservation and handling of water samples," 3rd edn, Dec. 15, 2003, 38 pages.

International Standard, "ISO 9377-2: Water quality—determination of hydrocarbon oil index—Part 2: Method using solvent extraction and gas chromatography," First edition, Oct. 15, 2000, 24 pages.

IP, "Determination of the oil content of effluent water—extraction and infra-red spectrometric method," IP 429/98, Oil in Water, 2012, 5 pages.

Jansen et al., "On the unusual solvent and the effect on the gas transport in perfluorinated Hyflon AD Membranes," Journal of Membrane Science, Jan. 2007, 287:1 (132-137), 6 pages.

Johnson et al, "The Molecular Complexity of Water in Organic Solvents Part II," J. Chem. Soc. A, Inorganic Phys. Theoretical, 1966, 77-78, 2 pages.

Kado et al., "Diagnosis of atmospheric pressure low temperature plasma and application to high efficient methane conversion," Catal. Today, Feb. 2004, 89:47-55, 9 pages.

Kanna et al., "Estimating the Amount of Moisture Content in Crude Oil Samples," International Refereed Journal of Engineering and Science (IRJES), Feb. 2017, 6:2 (59-62), 4 pages.

Khalifeh et al., "Decomposition of methane to hydrogen using nanosecond pulsed plasma reactor with different active volumes, voltages and frequencies", Appl. Energy, May 2016, 169:585-596, 12 pages.

Kikkinides et al., "Gas Separation and Purification by Polymeric Adsorbents: Flue Gas Desulfurization and S02 Recovery with Styrenic Polymer," Ind. Eng. Chem. Res., Oct. 1993, 32:10 (2365-2372), 8 pages.

Kim et al., "Effect of Demulsifier Partitioning on the Destabilization of Water-in-Oil Emulsions," Ind. Eng. Chem. Res., 1996, 35: 1141-1149, 9 pages.

Kim et al., "Separation performance of PEBAX/PEI hollow fiber composite membrane for SO2/CO2/N2 mixed gas," Chemical Engineering Journal, Nov. 2013, 233:242-250, 9 pages.

Kirchnerová et al., "The Solubility of Water in Low-Dielectric Solvents," Can. J. Chem, Aug. 26, 1976, 54:24 (3909-3916), 8 pages.

Klaehn et al., "Humidified Gas stream Separation at High Temperatures Using Matrimid 5218," Separation Science and Technology, Nov. 2012, 47:14-15 (2186-2191), 7 pages.

Knauss et al, "The solubility of p-xylene in water as a function of temperature and pressure and calculated thermodynamic quantities," Geochimica et Cosmochimica Acta, Jun. 1995, Mar. 1995, 59:12 (2443-2448), 6 pages.

Ko et al., "Analysis of purge gas temperature in cyclic TSA process," Pergmon, Chemical Engineering Science, Jan. 2002, 57:1 (179-195), 17 pages.

Kraftschik et al., "Dense film polyimide membranes for aggressive sour gas feed separations," Journal of Membrane Science, Feb. 1, 2013, 428: 608-619, 12 pages.

Kriebel, "Absorption, 2. Design of Systems and Equipment," Ullmann's Encyclopedia of Industrial Chemistry, 2012, 18 pages.

Lallemand et al., "Extending the treatment of highly sour gases: cryogenic distillation," Digital Refining: Processing, Operations & Maintenance, Jan. 2014, 8 pages.

Lallemand et al., "Highly sour gas processing: Bulk removal with SPREX Process," IPTC-10581-MS, International Petroleum Technology Conference, Nov. 2005, 18 pages.

Lallemand et al., "Solutions for the treatment of highly sour gases," Digital Refinding: Processing, Operations & Maintenance, Gas, Apr. 2012, 14 pages.

Lancia, et al., "Uncatalyzed heterogenous oxidation of calcium bisulfite," Chemical Engineering Science, Aug. 1996, 51:16 (3889-3896), 8 pages.

Lee et al., "Diamine-Anchored Polystyrene Resins for Reversible SO2 Adsorption," ACS Sustainable Chem. Eng., Feb. 2016, 4:4 (2012-2019), 8 pages.

Lockhart, "Sour oil and gas management: 3.3," New Upstream Technologies, vol. III/New Developments: Energy, Transport, Sustainability Encyclopedia of Hydrocarbons, 2007, 34 pages.

Lokhandwala et al., "Membrane separation of nitrogen from natural gas: A case study from membrane synthesis to commercial deployment," Journal of Membrane Science, Jan. 2010, 346: 270-279, 10 pages.

Lu et al., "Conversion of natural gas to C2 hydrocarbons via cold plasma technology," Journal of Natural Gas Chemistry, Jul. 2010, 19:4 (375-379), 5 pages.

Maitre et al., "Plasma-enhanced catalysis for the upgrading of methane: A review of modelling and simulation methods," Reaction Chemistry & Engineering, Mar. 2020, 5:814-837, 23 pages.

Mandal et. al., "M.A.L.D.I.-T.O.F. mass spectrometry characterization of 4-alkyl substituted phenol-formaldehyde novalac type resins," Polymer, 1997, 38:26 (6267-6271), 5 pages.

Martínez-Salazar et al., "Hydrogen production by methane reforming with H2S using Mo. Cr/ZrO2—SBA15 and Mo, Cr/ZrO2—La2O3 catalyst," Int. J. Hydrogen Energy, Dec. 2015, 48:17272-17283, 12 pages.

masterbond.com [online], "Epoxies with Low Coefficient of Thermal Expansion," available on or before May 12, 2015, via Internet Archive: Wayback Machine URL: <https://web.archive.org/web/20150512012852/https://www.masterbond.com/properties/epoxies-low-coefficient-thermal-expansion>, retrieved on Sep. 15, 2020, URL: <https://www.masterbond.com/properties/epoxies-low-coefficient-thermal-expansion>, 2 pages.

Merkel and Toy, "Comparison of Hydrogen Sulfide Transport Properties in Fluorinated and Nonfluorinated Polymers," Macromolecules, Sep. 2006, 39:22 (7591-7600), 10 pages.

mitchell.com [online], "Impedance," Impedance Products, URL: <http://www.michell.com/uk/technology/impedence.htm> retrieved Sep. 9, 2019, available on or before Jun. 2019, 2 pages.

Mogildeea et al., "The assessment of carbon dioxide dissociation using a single-mode microwave plasma generator," Molecules, Mar. 2020, 25:1558, 10 pages.

Neisi, "Effect of Mixing Efficiency in Dilution Water Consumption in a Crude Oil Desalting Plant," 2011, 3rd International Conference on Chemical, Biological and Environmental Engineering, 20:109-113, 5 pages.

Odberg et al., "Studies of water in organic solvents using NMR and partition techniques-II Di-isopropyl ether, dibutyl phthalate and chloroform," Journal of Inorganic and Nuclear Chemistry, Aug. 1972, Mar. 18, 1971, 34:8 (2605-2616), 12 pages.

Oikawa et al., "Seawater Flue Gas Deslfurization: Its Technical Implications and Performance Results," Environmental Progress, Apr. 2003, 22:1 (67-73), 7 pages.

Paidar et al., "Membrane electrolysis—History, current status and perspective," Electrochimica Acta., 2016, 209: 737-756, 69 pages.

Palma et al., "A review about the recent advances in selected nonthermal plasma assisted solid-gas phase chemical processes," Nanomaterials, 2020, 10:1596, 56 pages.

Ramakers et al., "Gliding arc plasmatron: Providing an alternative method for carbon dioxide conversion," ChemSusCHem, 2017, 10:12 (2642-2652), 11 pages.

Ramasubramanian, "CO2 (H2S)-selective membranes for fuel cell hydrogen purification and flue gas carbon capture: an experimental (56) References Cited

OTHER PUBLICATIONS and process modeling study," Dissertation for the degree of Doctor of Philosophy, Ohio state University, 2013, 270 pages.
Raynel et al., "A new method to select demulsifiers and optimize dosage at wet crude oil separation facilities," Oil & Gas Science and Technology—Rev. IFP Energies Nouvelles, 2021, 76:19, 11 pages.
Reddy et al., "Kinetics of hydrogen sulfide decomposition in a DBD plasma reactor operated at high temperature," Journal of Energy Chemistry, 2013, 22:382-386, 5 pages.
Ren et al., "Ionic liquids: Functionalization and absorption of SO2," Green Energy & Environment, Jul. 2018, 3:3 (179-190), 12 pages.
Robeson, "The upper bound revisited," Journal of Membrane Science, Jul. 15, 2008, 320 (390-400), 11 pages.
Roy et al., "Aspen-HYSYS Simulation of Natural Gas Processing Plant," Journal of Chemical Engineering, IEB, Dec. 2011, 26:1, 4 pages.
Rufford et al., "The removal of CO2 and N2 from natural gas: A review of conventional and emerging process technologies," Journal of Petroleum Science and Engineering, Sep. 2012, 94-95: 123-154, 32 pages.
Schei et al., "Transient simulations of gas-oil-water separation plants," Modeling, Identification and Control, 1991, 12: 1 (27-46), 20 pages.
Sensorland.com [online], "Impedance Moisture Sensor Technology," How Sensors work—Moisture Sensors, retrieved from URL: <http://www.sensorland.com/HowPage029.html>, retrieved Sep. 9, 2019, 2 pages.
Shell Global Solutions International BV, "Cansolv Technologies Inc. SO2 Scrubbing System," fact sheet, 2010.
Simo et al., "Adsorption/Desorption of Water and Ethanol on 3A Zeolite in Near-Adiabatic Fixed Bed, " Ind. Eng. Chem. Res., Sep. 2009, 48:20, 14 pages.
Sivalls et al., "Oil and Gas Separation Design Manual," Section: 300, Technical Bulletin, Feb. 10, 2009, 142:7, 63 pages.
Sun et al., "Application of seawater to enhance SO2 removal from simulated flue gas through hollow fiber membrane contactor," Journal of Membrane Science, 2008, 312:6-14, 9 pages.
Tailor et al., "Supported Polytertiary Amines: Highly Efficient and Selective SO2 Adsorbents," Environ. Sci. Technol., Jan. 2014, 48:3 (2025-2034), 10 pages.
Vaisala.com [online], "Vaisala HUMICAP Sensor for Measuring Moisture in Oil," Technology Description, retrieved from URL: <https://www.vaisala.com/sites/default/files/documents/HUMICAP-for-Moisture-in-oil-B211231EN-A.pdf> 2012, 2 pages.
Vasudevan, "Membranes and Diaphragms for Electrochemical Processes (Part—I)," Res. J. Chem. Sci., Feb. 2013, 3:2 (1-3), 3 pages.
Waterston et al., "Electrochemical oxidation of sulfide ion ata boron-doped diamond anode," Journal of applied electrochemistry, 2007, 37.3:367-373, 7 pages.
Weiland et al., "Distribution of HCN in sour water systems—Digital Refining," Apr. 2014, 5 pages.
Whitehead, "Plasma-catalysis: The known knowns, the known unknowns and the unknown unknowns," Journal of Physics, May 2016, 49:243001, 60 pages.
Wikipedia.com [online] "Thermal Diode," last revised Feb. 2019, retrieved on Oct. 7, 2019, retrieved from URL <https://en.wikipedia.org/wiki/Thermal_diode>, 2 pages.
Wikipedia.com [online], "Dielectric barrier discharge," Retrieved Oct. 29, 2021 from URL <https://en.wikipedia.org/wiki/Dielectric_barrier_discharge>, 7 pages.
Wu et al., "Effect of Demulsifier Properties on Destabilization of Water-in-Oil Emulsion," May 2003, Energy & Fuels, 2003, 17: 1554-1559, 6 pages.
Wu et al., "Preparation and SO2 Absorption /Desorption Properties of Crosslinked Poly(1,1,3,3-Tetramethylguanidine Acrylate) Porous Particles," Macromolecular Rapid Communications, Nov. 2006, 27:22 (1949-1954), 6 pages.
Xia et al., "Efficient, Selective, and Reversible SO2 Capture with Highly Crosslinked Ionic Microgels via a Selective Swelling Mechanism," Advanced Functional Materials, Jan. 2018, 28:13 (1704292), 10 pages.
Xu et al., "Non-thermal plasma catalysis for CO2 conversion and catalyst design for the process," J. Phys. D: Appl. Phys. Mar. 2021, 54:233001, 20 pages.
Xuan et al., "Plasma oxidation of H2S over non-stoichiometric LaxMnO3 perovskite catalysts in a dielectric barrier discharge reactor," Catalysts, Aug. 2018, 8:317.
Yang, "Chapter 2: Measurement of Oil in Produced Water," in Lee et al., Produced water, Springer Science+Business Media, 2011, 57-88, 32 pages.
Zhao et al. , "Decomposition of hydrogen sulfide in non-thermal plasma aided by supported CdS and ZnS semiconductors," Green Chemistry, Apr. 2013, 15:1509-1513, 5 pages.
Zhao et al., "SO2 Absorption by Carboxylate Anion-Based Task-Specific Ionic Liquids: Effect of Solvents and Mechanism," Ind. Eng. Chem. Res., Dec. 2016, 55:50 (12919-12928), 10 pages.
Zou et al., "CO2—Selective polymeric membranes containing amines in crosslinked poly (vinyl alcohol)," Journal of Membrane Science, Dec. 2006, 286:310-321, 12 pages.
scbt.com [online], "Tyloxapol," Biotechnology, Jan. 2021, retrieved Apr. 3, 2023, retrieved from URL <https:www.scbt.com/p/tyloxapol-25301-02-4>, 1 page.
PCT International Search Report and Written Opinion in International Appln. No. PCT/US2022/052653, dated Apr. 12, 2023, 14 pages.

\* cited by examiner

2-ISO-ALKYL-2-(4-HYDROXYPHENYL) PROPANE DERIVATIVES USED AS EMULSION BREAKERS FOR CRUDE OIL

TECHNICAL FIELD

This disclosure describes demulsifying polymers that are 2-iso-alkyl-2-(4-hydroxyphenyl)propane derivatives. The demulsifiers can be used to dewater wet crude oil emulsions.

BACKGROUND

Crude oil is typically extracted with dispersed water in varying concentrations. The water-in-oil (W/O) emulsions are believed to be initially formed during the migration of oil and water through the porous reservoir rocks to the production wells and subsequent transport to production facilities for phase separation. Further emulsification of the water and oil can occur due to pressure drops across choke valves at production headers used to manage production flows, which creates significant agitation and turbulent energy.

The dispersed water droplets are stabilized by surface active compounds naturally present in the oil such as resins, asphaltenes, solid particles, organic acids and bases. These surfactants migrate to the oil-water interface, forming a film around the water droplets and slowing the natural process of coalescence between droplets. The film significantly influences whether the emulsion separates easily (loose emulsion) or does not separate spontaneously (tight emulsion). Tight emulsions require great investment by oil companies in processes and chemical intervention to separate, or break, the emulsion to produce crude oil within export specifications of 0.2 v/v % basic sediment and water (BS&W) and 10 lbs. of total dissolved salts per thousand barrels of oil (PTB). Thus, the composition of crude oils can vary greatly from one producing field to another, resulting in different combinations of these parameters with unique effects. In some particularly tight oil emulsions, water cannot be separated solely by physical methods, such as, retention, heating, and electrocoalescence. In such cases, a combination of physical and chemical methods is required to achieve the desired water separation.

Crude oil production facilities require rapid and efficient separation of the water from the W/O emulsion to yield the wet crude oil that is then sent for further purification (desalting and dehydrating). Compounds called demulsifiers, or demulsifying polymers, have been used to break such crude oil-water emulsions. To have a high-performing demulsifying polymer (for example, fast and able to dewater large volumes) allows for production of more on-spec dry crude oil as well as better control of the overall process (for example, loads on dehydrators).

Thus, there is a need for demulsifiers that are faster and more efficient in dewatering wet crude oil emulsions than known demulsifiers.

SUMMARY

Provided in the present disclosure is a demulsifying polymer of Formula (I):

where PPO is polypropylene oxide having the formula:

PEO is polyethylene oxide having the formula:

x is an integer between 0 and 10; y is an integer between 0 and 10; m is an integer between 0 and 20; and n is an integer between 3 and 10.

In some embodiments, x is an integer between 3 and 6. In some embodiments, y is an integer between 3 and 6. In some embodiments, the ratio of x to y is between 0.75 and 1.2.

In some embodiments, m is an integer between 1 and 8. In some embodiments, m is 2.

In some embodiments, n is an integer between 5 and 7.

In some embodiments of the demulsifying polymer of the present disclosure, x is an integer between 3 and 6; y is an integer between 3 and 6; m is an integer between 1 and 8; and n is an integer between 5 and 7. In some embodiments, m is 2.

In some embodiments, the compound of Formula (I) has the structure:

Also provided in the present disclosure is a demulsifier composition that includes the compound of Formula (I). In some embodiments, the demulsifier composition further includes a solvent, a clarifier, or combination thereof.

Provided in the present disclosure is a method of preparing the demulsifying polymer of Formula (I). In some embodiments, the method includes: reacting phenol with an alcohol to form an alkyl phenol monomer having the structure:

reacting the alkyl phenol monomer with formaldehyde to form an oligomer having the structure:

and
reacting the oligomer with PPO and PEO to form the compound of Formula (I). In some embodiments of the method, m is an integer between 1 and 8. In some embodiments, m is 2. In some embodiments, n is an integer between 5 and 7. In some embodiments of the method, the compound of Formula (I) has the structure:

In some embodiments, the method further includes mixing the compound of Formula (I) with a clarifier and a solvent to form a demulsifier composition.

Also provided in the present disclosure is a method of dewatering a water-in-oil emulsion. In some embodiments, the method includes adding a demulsifier composition comprising the demulsifying polymer of Formula (I) to a water-in-oil emulsion and separating the water from the emulsion. In some embodiments, the water-in-oil emulsion is a crude oil emulsion. In some embodiments, the crude oil emulsion is a refinery desalting emulsion. In some embodiments, the crude oil emulsion is a crude oil production emulsion.

Also provided in the present disclosure is a method of treating produced petroleum that contains an emulsion. In some embodiments, the method includes contacting the produced petroleum containing the emulsion with a demulsifier composition to reduce or eliminate the emulsion, where the demulsifier composition contains a compound of Formula (I).

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Due to a number of factors involved in the production process, oil and water mix, creating an emulsion. This is undesirable, because when crude oil is refined, the oil should be as dry as possible as water can damage the refinery, induce corrosion, and reduce the efficiency of the crude oil distillation process. Provided in the present disclosure are demulsifying polymers, or demulsifiers, that can be used to break crude oil-water emulsions. In some embodiments, the demulsifiers exhibit improved water separation performance as compared to known demulsifiers.

In some embodiments, the demulsifiers of the present disclosure separate water from oil more quickly than known demulsifiers. In some embodiments, the demulsifiers of the present disclosure are more efficient in dewatering wet crude oil emulsions than known demulsifiers. For example, the demulsifiers allow for dewatering of larger volumes of water than known demulsifiers.

The demulsifying polymers of the present disclosure have an iso-alkyl chain and two methyl groups on the alkyl segment on the formaldehyde-phenolic backbone. Such demulsifiers are shown to be faster and more efficient at separating water from a wet crude oil emulsion than known demulsifying polymers. Thus, provided in the present disclosure are methods of separating water from a wet crude oil emulsion that involves addition of a demulsifying polymer of the present disclosure to the emulsion. In some embodiments, the demulsifying polymers break emulsions at low temperatures, such as around 30° C. In some embodiments, the demulsifying polymers break stable emulsions. In some embodiments, the demulsifying polymers are used for water-in-crude oil emulsions during oilfield production at a gas-oil separation plant (GOSP). In some embodiments, the demulsifying polymers are used for desalting water-in-crude oil emulsion at a refinery.

Without wishing to be bound by any particular theory, it is believed that the combination of the iso-alkyl chain and the dimethyl of the propane segment on the formaldehyde-phenolic backbone of the demulsifiers of the present disclosure results in unexpected improvement in water separation.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately.

For example, a claimed act of doing X and a claimed act of doing Y can be conducted simultaneously within a single operation, and the resulting process will fall within the literal scope of the claimed process.

A "demulsifier," also known as an "emulsion breaker," is a chemical that is used to separate crude oil from water. Demulsifiers are chemicals designed to neutralize the stabilizing effect of emulsifying agents. Demulsifiers are surface-active compounds that, when added to the emulsion, migrate to the oil/water interface, rupture or weaken the rigid film, and enhance water droplet coalescence. The process by which oil and water emulsions are separated is known as "demulsification" and it can be done in a variety of ways, including addition of a chemical demulsifier to the emulsion. In some embodiments, the demulsifier is a polymer, referred to herein as a "demulsifying polymer."

"Dewatering," as used herein, is the process of removing or separating water from crude oil. In some embodiments, the water is removed or separated from an emulsion that is a water-in-oil emulsion.

As used in this disclosure, the term "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region that is in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground that is in fluid contact with liquid or gaseous petroleum materials or water. In some embodiments, a subterranean formation is an oil well.

Demulsifier Compositions

Provided in this disclosure is a demulsifying polymer and demulsifier compositions containing the polymer. The demulsifying polymer and compositions containing the polymer can be used to dewater wet crude oil emulsions. In some embodiments, compositions containing the demulsifying polymer of the present disclosure are more efficient and faster at dewatering wet crude oil emulsions as compared to compositions that do not contain the demulsifying polymer of the present disclosure, but contain other, known demulsifying polymers.

Demulsifying Polymers

Provided in the present disclosure are demulsifying polymers. The demulsifying polymers are constituted of a formaldehyde-phenolic backbone and a lipophilic polypropylene oxide (PPO) and hydrophilic polyethylene oxide (PEO) section, where the formaldehyde-phenolic backbone is composed of phenol that is para-substituted with saturated hydrocarbon chains. The demulsifying polymers of the present disclosure have a hydrocarbon chain composed of a propane segment substituted in the 2 position (the middle of the propane chain) by a 4-hydroxyphenyl group (phenol group) and an iso-alkyl group. Without wishing to be bound by any particular theory, it is believed that it is the combination of the iso branching pattern, the hydrocarbon chain length, and the 2,2-propanediyl group on the phenolic backbone that leads to the improved properties of the demulsifying polymers of the present disclosure as compared to known alkoxylated phenolic polymers. For example, it is believed that the 2,2-propanediyl group on the phenolic backbone forces the demulsifying polymer into a brush, rather than comb, configuration, while the iso branching pattern and chain length increases the solubility in oil as well as the steric effect in order to push other species present in the oil at the interface (for example, asphaltenes).

In some embodiments, the demulsifying polymer is a compound of Formula (I):

wherein:

PPO is polypropylene oxide having the formula:

wherein the PPO is bonded to the phenyl ring through the oxygen atom; PEO is polyethylene oxide having the formula:

wherein the PEO is bonded to the —$CH_2$— of the PPO through the oxygen atom;

x is an integer between 0 and 10;

y is an integer between 0 and 10;

m is an integer between 0 and 20; and n is an integer between 3 and 10.

In some embodiments, PPO, or polypropylene oxide, is represented by the formula:

where x is an integer between 0 and 10, such as between 0 and 9, 0 and 8, 0 and 7, 0 and 6, 0 and 5, 0 and 4, 0 and 3, 0 and 2, 1 and 10, 1 and 9, 1 and 8, 1 and 7, 1 and 6, 1 and 5, 1 and 4, 1 and 3, 2 and 10, 2 and 9, 2 and 8, 2 and 7, 2 and 6, 2 and 5, 2 and 4, 3 and 10, 3 and 9, 3 and 8, 3 and 7, 3 and 6, 3 and 5, 4 and 10, 4 and 9, 4 and 8, 4 and 7, 4 and 6, 5 and 10, 5 and 9, 5 and 8, 5 and 7, 6 and 10, 6 and 9, 6 and 8, 7 and 10, 7 and 9, and 8 and 10. In some embodiments, x is 0, 1, 2, 3, 4, 5, 6, 7, 8, 9, or 10. In some embodiments, x is an integer between 3 and 6. In some embodiments, x is 4 or 5. In some embodiments, x is 3. In some embodiments, x is 4. In some embodiments, x is 5. In some embodiments, x is 6.

In some embodiments, PEO, or polyethylene oxide, is represented by the formula:

where y is an integer between 0 and 10, such as between 0 and 9, 0 and 8, 0 and 7, 0 and 6, 0 and 5, 0 and 4, 0 and 3, 0 and 2, 1 and 10, 1 and 9, 1 and 8, 1 and 7, 1 and 6, 1 and 5, 1 and 4, 1 and 3, 2 and 10, 2 and 9, 2 and 8, 2 and 7, 2 and 6, 2 and 5, 2 and 4, 3 and 10, 3 and 9, 3 and 8, 3 and 7, 3 and 6, 3 and 5, 4 and 10, 4 and 9, 4 and 8, 4 and 7, 4 and 6, 5 and 10, 5 and 9, 5 and 8, 5 and 7, 6 and 10, 6 and 9, 6 and 8, 7 and 10, 7 and 9, and 8 and 10. In some embodiments, y is 0, 1, 2, 3, 4, 5, 6, 7, 8, 9, or 10. In some embodiments, y is an integer between 3 and 6. In some embodiments, y is 4 or 5. In some embodiments, y is 3. In some embodiments, y is 4. In some embodiments, y is 5. In some embodiments, y is 6.

In some embodiments, x and y are the same. In some embodiments, x and y are different. In some embodiments, x is an integer between 3 and 6 and y is an integer between 3 and 6. In some embodiments, x is 4 and y is 4. In some embodiments, x is 5 and y is 5. In some embodiments, x is 6 and y is 6. In some embodiments, x is 4 and y is 5. In some embodiments, x is 5 and y is 4.

In some embodiments, the ratio of PPO to PEO (the ratio of x to y) is between 0.75 and 1.2, such as between 0.75 and 1.1, 0.75 and 1.0, 0.75 and 0.9, 0.75 and 0.8, 0.8 and 1.2, 0.8 and 1.1, 0.8 and 1.0, 0.8 and 0.9, 0.9 and 1.2, 0.9 and 1.1, 0.9 and 1.0, 1.0 and 1.2, 1.0 and 1.1, 1.1 and 1.2, or 0.75, 0.8, 0.85, 0.9, 0.95, 1.0, 1.05, 1.1, 1.15, 1.2.

In some embodiments, the PPO and PEO groups are distributed randomly. In some embodiments, the PPO group and PEO groups are attached to the phenol backbone as block copolymers, where the PPO block copolymer is directly bonded to the phenol backbone via an oxygen atom of the PPO group, and the PEO block copolymer is directly bonded to the PPO block copolymer via an oxygen atom of the PEO group and a —$CH_2$— of the PPO group.

The demulsifying polymers of the present disclosure have a 2-iso-alkyl-propyl group substituted on the phenol backbone in the para position. In some embodiments, m is an integer between 0 and 20, such as between 0 and 19, 0 and 18, 0 and 17, 0 and 16, 0 and 15, 0 and 14, 0 and 13, 0 and 12, 0 and 11, 0 and 10, 0 and 9, 0 and 8, 0 and 7, 0 and 6, 0 and 5, 0 and 4, 0 and 3, 0 and 2, 1 and 20, 1 and 19, 1 and 18, 1 and 17, 1 and 16, 1 and 15, 1 and 14, 1 and 13, 1 and 12, 1 and 11, 1 and 10, 1 and 9, 1 and 8, 1 and 7, 1 and 6, 1 and 5, 1 and 4, 1 and 3, 2 and 20, 2 and 19, 2 and 18, 2 and 17, 2 and 16, 2 and 15, 2 and 14, 2 and 13, 2 and 12, 2 and 11, 2 and 10, 2 and 9, 2 and 8, 2 and 7, 2 and 6, 2 and 5, 2 and 4, 3 and 20, 3 and 19, 3 and 18, 3 and 17, 3 and 16, 3 and 15, 3 and 14, 3 and 13, 3 and 12, 3 and 11, 3 and 10, 3 and 9, 3 and 8, 3 and 7, 3 and 6, 3 and 5, 4 and 20, 1 and 19, 4 and 18, 4 and 17, 4 and 16, 4 and 15, 4 and 14, 4 and 13, 4 and 12, 4 and 11, 4 and 10, 4 and 9, 4 and 8, 4 and 7, 4 and 6, 5 and 20, 5 and 19, 5 and 18, 5 and 17, 5 and 16, 5 and 15, 5 and 14, 5 and 13, 5 and 12, 5 and 11, 5 and 10, 5 and 9, 5 and 8, 5 and 7, 6 and 20, 6 and 19, 6 and 18, 6 and 17, 6 and 16, 6 and 15, 6 and 14, 6 and 13, 6 and 12, 6 and 11, 6 and 10, 6 and 9, 6 and 8, 7 and 20, 7 and 19, 7 and 18, 7 and 17, 7 and 16, 7 and 15, 7 and 14, 7 and 13, 7 and 12, 7 and 11, 7 and 10, 7 and 9, 8 and 20, 8 and 19, 8 and 18, 8 and 17, 8 and 16, 8 and 15, 8 and 14, 8 and 13, 8 and 12, 8 and 11, 8 and 10, 9 and 20, 9 and 19, 9 and 18, 9 and 17, 9 and 16, 9 and 15, 9 and 14, 9 and 13, 9 and 12, 9 and 11, 10 and 20, 10 and 19, 10 and 18, 10 and 17, 10 and 16, 10 and 15, 10 and

14, 10 and 13, 10 and 12, 11 and 20, 11 and 19, 11 and 18, 11 and 17, 11 and 16, 11 and 15, 11 and 14, 11 and 13, 12 and 20, 12 and 19, 12 and 18, 12 and 17, 12 and 16, 12 and 15, 12 and 14, 13 and 20, 13 and 19, 13 and 18, 13 and 17, 13 and 16, 13 and 15, 14 and 20, 14 and 19, 14 and 18, 14 and 17, 14 and 16, 15 and 20, 15 and 19, 15 and 18, 15 and 17, 16 and 20, 16 and 19, 16 and 18, 17 and 20, 17 and 19, and 18 and 20. In some embodiments, m is 0, 1, 2, 3, 4, 5, 6, 7, 8, 9, 10, 11, 12, 13, 14, 15, 16, 17, 18, 19, or 20. In some embodiments, m is an integer between 0 and 10. In some embodiments, m is an integer between 0 and 5. In some embodiments, m is an integer between 1 and 8. In some embodiments, m is an integer between 1 and 3. In some embodiments, m is 0. In some embodiments, m is 1. In some embodiments, m is 2. In some embodiments, m is 3.

In the demulsifying polymers of the present disclosure, the phenolic backbone is made up of repeating phenol units, linked through a methylene linker. In some embodiments, n is an integer between 3 and 10, such as between 3 and 9, 3 and 8, 3 and 7, 3 and 6, 3 and 5, 4 and 10, 4 and 9, 4 and 8, 4 and 7, 4 and 6, 5 and 10, 5 and 9, 5 and 8, 5 and 7, 6 and 10, 6 and 9, 6 and 8, 7 and 10, 7 and 9, and 8 and 10. In some embodiments, n is 3, 4, 5, 6, 7, 8, 9, or 10. In some embodiments, n is an integer between 5 and 7. In some embodiments, n is 3. In some embodiments, n is 4. In some embodiments, n is 5. In some embodiments, n is 6. In some embodiments, n is 7. In some embodiments, the phenolic backbone is made up of 3 to 10 repeating phenol units. In some embodiments, the phenolic backbone is made up of 5 to 7 repeating phenol units.

In some embodiments of the demulsifying polymer of the present disclosure, x is an integer between 3 and 6; y is an integer between 3 and 6; m is an integer between 1 and 8; and n is an integer between 5 and 7.

In some embodiments of the demulsifying polymer of the present disclosure, x is an integer between 3 and 6; y is an integer between 3 and 6; m is 2; and n is an integer between 5 and 7.

In some embodiments, the compound of Formula (I) has the structure:

wherein n, x, and y are as described elsewhere in the present disclosure. In some embodiments, x is an integer between 3 and 6; y is an integer between 3 and 6; and n is an integer between 5 and 7.

Demulsifier Composition

Provided in the present disclosure is a demulsifier composition that contains the demulsifying polymer of Formula (I) as described in the present disclosure. In some embodiments, the demulsifier composition contains, in addition to the demulsifying polymer of Formula (I), one or more of a solvent, clarifier, or combinations thereof.

In some embodiments, the demulsifier composition contains about 25 wt % to about 50 wt % of the demulsifying polymer of Formula (I) as described in the present disclosure, such as about 25 wt % to about 45 wt %, about 25 wt % to about 40 wt %, about 25 wt % to about 35 wt %, about 25 wt % to about 30 wt %, about 30 wt % to about 50 wt %, about 30 wt % to about 45 wt %, about 30 wt % to about 40 wt %, about 30 wt % to about 35 wt %, about 35 wt % to about 50 wt %, about 35 wt % to about 45 wt %, about 35 wt % to about 40 wt %, about 40 wt % to about 50 wt %, about 40 wt % to about 45 wt %, about 45 wt % to about 50 wt %, or about 25 wt %, about 30 wt %, about 35 wt %, about 37 wt %, about 40 wt %, about 45 wt %, or about 50 wt %. In some embodiments, the demulsifier composition contains about 35 wt % to about 40 wt % of the demulsifying polymer of Formula (I) as described in the present disclosure. In some embodiments, the demulsifier composition contains about 37 wt % of the demulsifying polymer of Formula (I) as described in the present disclosure.

In some embodiments, the demulsifier composition contains one or more solvents. Examples of suitable solvents include, but are not limited to, alcohols, alkylene glycols, polyalkylene glycols, xylenes, toluene, mono-aromatics, and combinations thereof. In some embodiments, the solvent contains an alkylene glycol. In some embodiments, the solvent contains diethylene glycol. In some embodiments, the solvent contains an alcohol. In some embodiments, the solvent contains n-butanol. In some embodiments, the solvent contains an alkylene glycol and an alcohol. In some embodiments, the solvent contains diethylene glycol and n-butanol.

In some embodiments, the total amount of solvent in the demulsifier composition is about 40 wt % to about 70 wt %, such as about 40 wt % to about 65 wt %, about 40 wt % to about 60 wt %, about 40 wt % to about 55 wt %, about 40 wt % to about 50 wt %, about 40 wt % to about 45 wt %, is about 45 wt % to about 70 wt %, about 45 wt % to about 65 wt %, about 45 wt % to about 60 wt %, about 45 wt % to about 55 wt %, about 45 wt % to about 50 wt %, about 50 wt % to about 70 wt %, about 50 wt % to about 65 wt %, about 50 wt % to about 60 wt %, about 50 wt % to about 55 wt %, about 55 wt % to about 70 wt %, about 55 wt % to about 65 wt %, about 55 wt % to about 60 wt %, about 60 wt % to about 70 wt %, about 60 wt % to about 65 wt %, about 65 wt % to about 70 wt %, or about 40 wt %, about 45 wt %, about 50 wt %, about 55 wt %, about 60 wt %, about 65 wt %, or about 70 wt %. In some embodiments, the total amount of solvent in the demulsifier composition is about 45 wt % to about 65 wt %. In some embodiments, the total amount of solvent in the demulsifier composition is about 50 wt % to about 60 wt %. In some embodiments, the total amount of solvent in the demulsifier composition is about 55 wt % to about 60 wt %. In some embodiments, the total amount of solvent in the demulsifier composition is about 57 wt %.

In some embodiments, the solvent is a mixture of an alkylene glycol and an alcohol. In some embodiments, the solvent is a mixture of diethylene glycol and n-butanol. In some embodiments, the amount of alkylene glycol is about 60 wt % to about 75 wt % of the total amount of solvent, such as about 60 wt % to about 70 wt %, about 60 wt % to about 65 wt %, about 65 wt % to about 75 wt %, about 65 wt % to about 70 wt %, about 70 wt % to about 75 wt %, or about 60 wt %, about 65 wt %, about 67 wt %, about 70 wt %, or about 75 wt %. In some embodiments, the amount of alkylene glycol is about 67 wt % of the total amount of solvent. In some embodiments, the alkylene glycol is diethylene glycol. In some embodiments, the amount of alcohol is about 25 wt % to about 40 wt % of the total amount of solvent, such as about 25 wt % to about 35 wt %, about 25 wt % to about 30 wt %, about 30 wt % to about 40 wt %, about 30 wt % to about 35 wt %, about 35 wt % to about 40 wt %, or about 25 wt %, about 30 wt %, about 33 wt %, about 35 wt %, or about 40 wt %. In some embodiments, the amount of alcohol is about 33 wt % of the total amount of solvent.

In some embodiments, the alcohol is n-butanol. In some embodiments, the amount of alkylene glycol is about 67 wt % of the total amount of solvent and the amount of alcohol is about 33 wt % of the total amount of solvent. In some embodiments, the amount of diethylene glycol is about 67 wt % of the total amount of solvent and the amount of n-butanol is about 33 wt % of the total amount of solvent.

In some embodiments, the demulsifier composition contains one or more clarifiers. Examples of suitable clarifiers include, but are not limited to, trimethylbenzene, naphthalene, and combinations thereof. In some embodiments, the clarifier is a trimethylbenzene. In some embodiments, the clarifier is 1,2,4-trimethylbenzene. In some embodiments, the clarifier is naphthalene. In some embodiments, the clarifier is a mixture of 1,2,4-trimethylbenzene and naphthalene.

In some embodiments, the amount of clarifier in the demulsifier composition is about 0.1 wt % to about 10 wt %, such as about 0.1 wt % to about 9 wt %, about 0.1 wt % to about 8 wt %, about 0.1 wt % to about 7 wt %, about 0.1 wt % to about 6 wt %, about 0.1 wt % to about 5 wt %, about 0.1 wt % to about 4 wt %, about 0.1 wt % to about 3 wt %, about 0.1 wt % to about 2 wt %, about 0.1 wt % to about 1 wt %, about 0.1 wt % to about 0.5 wt %, about 0.5 wt % to about 10 wt %, about 0.5 wt % to about 9 wt %, about 0.5 wt % to about 8 wt %, about 0.5 wt % to about 7 wt %, about 0.5 wt % to about 6 wt %, about 0.5 wt % to about 5 wt %, about 0.5 wt % to about 4 wt %, about 0.5 wt % to about 3 wt %, about 0.5 wt % to about 2 wt %, about 0.5 wt % to about 1 wt %, about 1 wt % to about 10 wt %, about 1 wt % to about 9 wt %, about 1 wt % to about 8 wt %, about 1 wt % to about 7 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 10 wt %, about 2 wt % to about 9 wt %, about 2 wt % to about 8 wt %, about 2 wt % to about 7 wt %, about 2 wt % to about 6 wt %, about 2 wt % to about 5 wt %, about 2 wt % to about 4 wt %, about 2 wt % to about 3 wt %, about 3 wt % to about 10 wt %, about 3 wt % to about 9 wt %, about 3 wt % to about 8 wt %, about 3 wt % to about 7 wt %, about 3 wt % to about 6 wt %, about 3 wt % to about 5 wt %, about 3 wt % to about 4 wt %, about 4 wt % to about 10 wt %, about 4 wt % to about 9 wt %, about 4 wt % to about 8 wt %, about 4 wt % to about 7 wt %, about 4 wt % to about 6 wt %, about 4 wt % to about 5 wt %, about 5 wt % to about 10 wt %, about 5 wt % to about 9 wt %, about 5 wt % to about 8 wt %, about 5 wt % to about 7 wt %, about 5 wt % to about 6 wt %, about 6 wt % to about 10 wt %, about 6 wt % to about 9 wt %, about 6 wt % to about 8 wt %, about 6 wt % to about 7 wt %, about 7 wt % to about 10 wt %, about 7 wt % to about 9 wt %, about 7 wt % to about 8 wt %, about 8 wt % to about 10 wt %, about 8 wt % to about 9 wt %, about 9 wt % to about 10 wt %, or about 0.1 wt %, about 0.5 wt %, about 1 wt %, about 2 wt %, about 3 wt %, about 4 wt %, about 5 wt %, about 6 wt %, about 7 wt %, about 8 wt %, about 9 wt %, or about 10 wt %. In some embodiments, the amount of clarifier in the demulsifier composition is about 1 wt % to about 10 wt %. In some embodiments, the amount of clarifier in the demulsifier composition is about 5 wt % to about 10 wt %. In some embodiments, the amount of clarifier in the demulsifier composition is about 6 wt %. In some embodiments, the clarifier is 1,2,4-trimethylbenzene.

Thus, provided in the present disclosure is a demulsifier composition that contains the demulsifying polymer of Formula (I) as described in the present disclosure, one or more solvents, and a clarifier. In some embodiments, the demulsifier composition contain about 25 wt % to about 50 wt % of the demulsifying polymer of Formula (I) as described in the present disclosure, about 40 wt % to about 70 wt % solvent, and about 0.1 wt % to about 10 wt % clarifier. In some embodiments, the demulsifier composition contain about 35 wt % to about 40 wt % of the demulsifying polymer of Formula (I) as described in the present disclosure, about 55 wt % to about 60 wt % solvent, and about 5 wt % to about 10 wt % clarifier. In some embodiments, the demulsifier composition contain about 37 wt % of the demulsifying polymer of Formula (I) as described in the present disclosure, about 57 wt % solvent, and about 6 wt %. In some embodiments, the solvent is a mixture of an alkylene glycol and an alcohol. In some embodiments, the solvent is a mixture of diethylene glycol and n-butanol. In some embodiments, the clarifier is 1,2,4-trimethylbenzene.

Method of Preparing the Demulsifying Polymer

Provided in the present disclosure is a method of preparing a demulsifying polymer, such as the emulsifying polymer of Formula (I) described in the present disclosure. In some embodiments, the method includes reacting phenol with an alcohol to form an alkyl phenol monomer having the structure:

where m is an integer between 0 and 20. In some embodiments, the alcohol has the formula:

In some embodiments, the alcohol is 2,6-dimethylheptan-2-ol. In some embodiments, the reacting is done in the presence of a catalyst. In some embodiments, the catalyst is p-toluene sulfonic acid.

In some embodiments, the method includes reacting the alkyl phenol monomer with formaldehyde to form an oligomer having the structure:

where n is an integer between 3 and 10. In some embodiments, the oligomer contains between 3 and 10 phenol units. In some embodiments, the oligomer contains between 5 and 7 phenol units. In some embodiments, the degree of polymerization is controlled by adjusting the molar ratio of alkyl phenol monomer to formaldehyde (P/F ratio). In some embodiments, the P/F ratio is about 1:0.5 to about 1:1. In some embodiments, the molar amount of phenol is greater than the molar amount of formaldehyde so as to encourage phenolic end groups on the oligomer. In some embodiments, the reacting is done in the presence of a catalyst. In some embodiments, the catalyst is present in an amount of about 1 mol % to about 20 mol % of the alkyl phenol monomer, such as about 5 mol % to about 15 mol %, or about 10 mol %. In some embodiments, the catalyst is zinc acetate.

In some embodiments, the method includes reacting the oligomer with PPO and PEO to form the compound of Formula (I). In some embodiments, the oligomer is first reacted with PPO, then reacted with PEO. In some embodiments, the ratio of PPO to PEO is equimolar. In some embodiments, the amount of PPO monomer and PEO monomer is about 3 to about 6 repeats of each monomer. In some embodiments, the amount of PPO monomer and PEO monomer is about 4 repeats of each monomer.

In some embodiments, the method further includes mixing the compound of Formula (I) with one or more solvents, a clarifier, or combination thereof, to form a demulsifier composition. In some embodiments, the method includes mixing the compound of Formula (I) with a clarifier and a mixture of solvents. In some embodiments, the method includes mixing the compound of Formula (I) with a clarifier and a mixture of an alkylene glycol and a solvent. In some embodiments, the method includes mixing the compound of Formula (I) with 1,2,4-trimethylbenzene and a mixture of diethylene glycol and n-butanol.

In some embodiments of the method, the compound of Formula (I) has the structure:

Methods of Using the Demulsifier Composition Containing the Demulsifying Polymer The demulsifying polymers of the present disclosure that have an iso-alkyl group (rather than a linear alkyl group) and a 2,2-propanediyl group between the phenol ring and the iso-alkyl group that is composed of para-tertiary-alkylphenols (alkyl: $C_n$ with n>4), has a greater activity towards dewatering wet crude oil emulsions than known commercial demulsifying polymers, such as those that contain linear alkylphenol (for example, nonylphenol) or neo-alkylphenol (for example, tert-butylphenol) groups. It has surprisingly been found that the insertion of a 2,2-propanediyl group between the iso-alkyl group and the phenol ring significantly increases the water separation activity of the alkoxylated phenolic polymers of the present disclosure. In some embodiments, the demulsifying polymers of the present disclosure are more effective at separating water from a water-in-oil emulsion than known demulsifying polymers, including those that have shown little to no effect on water separation in the same emulsion. In some embodiments, the demulsifying polymers of the present disclosure and demulsifier compositions that contain the demulsifying polymers of the present disclosure are used for water-in-oil emulsions in a subterranean formation for drilling operations. In some embodiments, the demulsifying polymers of the present disclosure and demulsifier compositions that contain the demulsifying polymers of the present disclosure are used for oilfield production at gas-oil separation plants. In some embodiments, the demulsifying polymers of the present disclosure and demulsifier compositions that contain the demulsifying polymers of the present disclosure are used for desalting at refineries. Thus, provided in the present disclosure are methods of using the demulsifying polymers of the present disclosure and demulsifier compositions that contain the demulsifying polymers of the present disclosure for such applications.

The demulsifying polymers of the present disclosure can be used alone or in blends with other demulsifiers or emulsion breaker materials, including, but not limited to, other alkoxylated alkylphenol-formaldehyde polymers, alkoxylated polyvinyl esters, alkoxylated phenols, alkoxylated polyalcohols (also known as polyols), polyethylene or polypropylene glycols and derivatives, and arylsulfonates. The demulsifying polymers of the present disclosure can also be used in combination with corrosion inhibitors, viscosity reducers, desalting polymers, and other oilfield chemicals used in crude oil production, refining, and chemical processing.

In some embodiments, the demulsifying polymer of the present disclosure is used to resolve emulsions encountered in crude oil production. In some embodiments, the demulsifying polymer of the present disclosure or composition containing the demulsifying polymer of the present disclosure is introduced into the crude oil emulsion by injecting prior entering the oil production facility, by injecting into the crude oil before the desalter, or by injecting into the crude oil process stream at a point between the oil production and the final oil storage tank. The demulsifier composition can be injected continuously or in batch fashion. In some embodiments, the injection is accomplished using electric or gas pumps.

After injection, in some embodiments the treated crude oil emulsion is allowed to stand in a quiescent state until the desired separation into distinct layers of water and oil results. Once separation into distinct layers of water and oil has been effected, any means known to those of skill in the art can be utilized for withdrawing the free water and separating crude oil.

Also provided in the present disclosure is a method of dewatering a water-in-oil emulsion. In some embodiments, the method includes adding a demulsifier composition comprising the demulsifying polymer of Formula (I) as described in the present disclosure to a water-in-oil emulsion. In some embodiments, the method involves separating the water from the emulsion. In some embodiments, the water-in-oil emulsion is a crude oil emulsion. In some embodiments, the crude oil emulsion is a refinery desalting emulsion. In some embodiments, the crude oil emulsion is a crude oil production emulsion.

In the methods of the present disclosure, the dewatering takes place at temperatures of about 30° C. and about 70° C., such as about 30° C. to about 65° C., about 30° C. to about 60° C., about 30° C. to about 55° C., about 30° C. to about 50° C., about 30° C. to about 45° C., about 30° C. to about 40° C., about 30° C. to about 40° C., about 35° C. to about 70° C., about 35° C. to about 65° C., about 35° C. to about 60° C., about 35° C. to about 55° C., about 35° C. to about 50° C., about 35° C. to about 45° C., about 35° C. to about 40° C., about 40° C. to about 70° C., about 40° C. to about 65° C., about 40° C. to about 60° C., about 40° C. to about 55° C., about 40° C. to about 50° C., about 40° C. to about 45° C., about 45° C. to about 70° C., about 45° C. to about 65° C., about 45° C. to about 60° C., about 45° C. to about 55° C., about 45° C. to about 50° C., about 50° C. to about 70° C., about 50° C. to about 65° C., about 50° C. to about 60° C., about 50° C. to about 55° C., about 55° C. to about 70° C., about 55° C. to about 65° C., about 55° C. to about 60° C., about 60° C. to about 70° C., about 60° C. to about 65° C., about 65° C. to about 70° C., or about 30° C., about 35° C., about 40° C., about 45° C., about 50° C., about 55° C., about 60° C., about 65° C., or about 70° C.

In some embodiments, the dewatering takes place at low temperatures, such as below about 40° C. In some embodiments, the dewatering takes place at about 30° C. In some embodiments, the dewatering takes place at temperatures below about 30° C.

Also provided in the present disclosure is a method of treating produced petroleum that contains an emulsion. In some embodiments, the method includes contacting the produced petroleum that contains the emulsion with a demulsifier composition to reduce or eliminate the emulsion. In some embodiments, the demulsifier composition contains a compound of Formula (I) as described in the present disclosure.

The amount of demulsifying polymer that is used depends on the particular crude oil emulsion being treated. In some embodiments, the optimum dosage is determined during a field test. In some embodiments, bottle tests, such as described in the present disclosure, are conducted in order to determine the optimum formulation, for example, the optimum formulation of demulsifying polymer, solvent, and clarifier. The desired amount of demulsifying polymer can vary depending on the specific characteristics of the emulsion. In some embodiments, the amount of demulsifying polymer is between less than about 1 ppm to about 50 ppm.

EXAMPLES

Example 1—Preparation of Demulsifying Polymers

A series of demulsifying alkoxylated phenolic polymers were prepared. Demulsifying alkoxylated phenolic polymers are constituted of a formaldehyde-phenolic backbone, a lipophilic polypropylene oxide (PPO) and hydrophilic polyethylene oxide (PEO) section. The formaldehyde-phenolic backbone is made of phenol with a para-substituted saturated hydrocarbon chain. The phenol structures making the backbone of the demulsifiers included 2-iso-hexyl-2-(4-hydroxyphenyl)-propane, and comparative examples para-tertiary-butylphenol, and para-tertiary-heptylphenol (Table 1).

TABLE 1

Phenols used in demulsifier backbone

| Phenol | Name | Structure |
|---|---|---|
| 1 | 2-iso-hexyl-2-(4-hydroxyphenyl)-propane |  |

TABLE 1-continued

Phenols used in demulsifier backbone

| Phenol | Name | Structure |
|---|---|---|
| 2 | para-tertiary-butylphenol |  |
| 3 | para-tertiary-heptylphenol |  |

Alkyl Phenol Monomer Synthesis

The phenolic monomers shown in Table 1 were produced by reacting 3 equivalents of phenol with 1 equivalent of the appropriate alcohol along with p-toluene sulfonic acid as a catalyst. The molar excess of phenol was chosen to minimize the amount of disubstituted ortho- and para-phenol produced during the reaction stage, because unremoved disubstituted material could, if not removed at a later date, lead to the formation of limited molecular weight oligomers, even when present in relatively minor amounts.

Phenol, along with p-toluene sulfonic acid, was added to a suitably sized three-neck round bottomed flask equipped with a magnetic stirrer and both a nitrogen gas inlet and outlet. All three necks were sealed with fresh (suba-type) seals and the contents purged with a gentle nitrogen flow while being heated to 110° C. via a thermostatically controlled oil bath. Once at constant temperature, the $N_2$ flow was stopped and the appropriate alcohol was added over 3-4 hours (either via dropping funnel or syringe pump depending on reaction size) with stirring while a constant temperature of 110° C. was maintained. At the end of the addition stage, a sample was withdrawn for analysis by TLC.

Heating was then maintained overnight (~16-18 hours) before a further sample was taken for TLC. Comparison of the TLC traces (carried out at similar concentrations of reaction mix in eluant) revealed no further noticeable reduction in the intensity of the remaining phenol spot compared to the intensity of the product spot. At this stage, the typical TLC plate revealed at least 4 spots; visualization was via development with aqueous potassium permanganate solution, with final spot development enhanced by gentle heating of the plate. Potassium permanganate was chosen as a stain in this case due to its sensitivity to aromatic and (to a lesser extent) hydroxyl containing species. The absolute $R_f$ value of each component present varied depending on eluant composition used. However, it was found that, certainly for the para-tertiary-heptylphenol and 2-iso-hexyl-2-(4-hydroxyphenyl)-propane derivatives, 80:20 volume hexane: ethyl acetate was most suitable. For the para-tertiary-butylphenol, a change to less polar 90:10 volume hexane: ethyl acetate produced a clearer product to impurities split on the plate. Variable $R_f$ values were typically is countered by running a phenol standard as part of a TLC, the response from which could be used to identify other spots present from their relative positions from phenol. Typically, the materials at this stage were light to dark amber/brown slightly viscous liquids. The bulk of residual excess phenol was removed by washing. Initially this was attempted by diluting the crude product with ethyl acetate (approximately 4:1 v/v) and then employing multiple water washes, multiple sodium bicarbonate washes, and multiple 5% w/w potassium hydroxide washes. Analysis of all these by TLC revealed no real change in residual phenol within the material in comparison to the original unwashed sample. Finally washing was attempted with 10% wt/wt potassium hydroxide and this immediately resulted in a darkly colored aqueous phase which indicated removal of at least some base soluble impurity and possibly phenol. Subsequent analysis of material washes multiple times with dilute KOH revealed a distinct reduction in phenol spot intensity compared to product intensity.

Large scale work ups were subsequently conducted by diluting in ethyl acetate (4-5 times by volume) and washing, first with multiple dilute (10% wt/wt) potassium hydroxide washes (in which the alkyl substituted product was found to have little or no solubility even as the potassium salt). This was continued until the amount of residual phenol was reduced significantly (it seemed difficult to completely remove all phenol at this stage and also this washing technique had little effect on the amount of long running peaks present).

This stage was followed by a dilute (5% mol) hydrochloric acid wash and 2-3 deionized water washes. These final aqueous washes proved to be the most troublesome due to both the emulsifying effect of the alkyl phenol and the small density difference seen between ethyl acetate and water. This effect could be mitigated by adding saturated brine at the separation stage. When most of the aqueous layer had been removed the organic phase was dried over anhydrous magnesium sulphate before being filtered and the solvent removed via rotary evaporation. Typical crude yields at this stage were (at least those found in the final few large batches used to produce the bulk of oligomers) of the order of 110-118% of theoretical. The excess encountered was due to the presence of a small amount of residual phenol and some solvent.

It was discovered that key factors in maximizing the yield of mono alkyl p-substituted phenol were primarily due to adding alcohol to phenol during the reaction (at above phenol melting point of 40° C., ideally at 110° C., to ensure melting of p-toluene sulfonic acid) over the longest is possible time; and using as large an excess of phenol (up to 4 times mole) as possible, though this impacted the amount of washing stages required to reduce residual phenol prior to distillation.

In order to produce sufficient monomer for larger batches, the materials were no longer purified by column chromatography, but rather fractional distillation was attempted, provided that boiling points at reduced pressure were low enough to allow a suitable separating column to be employed. Once the washing protocol above was established, along with a suitable length Vigreux distillation column being employed, product with a purity similar to that achieved through chromatography was achieved with the added advantage that large quantities of monomer could be obtained with each distillation.

A typical procedure employed on a pre-washed batch of para-tertiary-heptylphenol monomer is as follows.

Washed crude monomer was added to a suitably sized single-neck round bottom flask equipped with a magnetic follower. Usually flask volume was chosen such that when added the contents occupied just less than half the total volume. This flask was then set up in a thermostat-equipped oil bath on a magnetic stirrer heater. A Vigreux column of width ~2 cm and length ~30 cm was inserted into the socket of the flask and a thermometer equipped distillation head inserted into this. All glass/glass joints were carefully greased each time to ensure minimal loss of vacuum. No condenser was employed due to the involatility (boiling points under high vacuum were of the order of the products along with their associated viscosity (t-butyl phenol was a crystalline solid) and a vacuum delivery tube was connected directly to the still head thus minimizing product hold up and fraction mixing. Portions of the various fractions were collected in a three-way pig type collector which for the early more volatile components could be cooled with dry ice to minimize losses of volatiles to vacuum and preserve mass balance. Generally, a weighed portion of previously washed crude alkyl phenol monomer, from which the bulk of ethyl acetate solvent had been removed via rotary evaporation, was introduced to the distillation flask, the apparatus sealed and pumped down to a high vacuum at room temperature. The initial receiving flask was simultaneously cooled with dry ice in order to collect and quantify any residual ethyl acetate and other volatile species present in the reactor contents. After all initial low boiling material had been collected, the vacuum was broken and the contents of this flask were decanted, and a mass noted. The apparatus was then re-evacuated and the temperature of the contents slowly warmed to about 90° C., during this stage crystals of, presumably, remaining unreacted phenol which had not been is washed out could be seen forming in the fractionation column. This was alleviated by wrapping the column with aluminum foil. Having done this, distilled phenol was deposited on the outlet side of the still head and could be relatively easily "chased" into the cooled receiver by gentle warming with a hot air gun. Once the sublimation of phenol had ceased by observation, this fraction was also removed. Finally, the still was pumped down to high vacuum again and the contents heated slowly until a steady stream of viscous liquid droplets could be seen flowing into the chosen receiver. At this stage, due to the non-volatile nature of the distillate, no receiver cooling was required. Observation of the column at this point revealed a good amount of reflux return into the distillation flask, indicating that a fair degree of product separation was likely. Fractions were then collected in the three flasks of the pig with the bath temperature adjusted up slowly to ensure a constant slow distillation. Once full, the three flasks were removed and replaced with three fresh ones and the process repeated until only a small amount (<5%) of the original material remained in the distillation flask. Initial rapid analysis was carried out using thin layer chromatography (80:20 v/v hexane:ethyl acetate) and more in depth studies using $^1$H NMR spectroscopy.

When applied to produce pure para-tertiary-butylphenol, purification by distillation was found to be far more complex due to the crystalline nature of the product. Sublimation was attempted but due to a lack of suitable equipment a successful separation of product from ortho and disubstituted impurities was not achieved. Columning of the "best" distillation fraction produced through silica with a 90:10 hexane:ethyl acetate eluent, did yield relatively clean para-tertiary-butylphenol.

Oligomer Preparation

The reaction employed to prepare the oligomers was described by Mandal et al. (Polymer (1997) 38(26):6267-6271). The phenol:formaldehyde mol ratio was varied to adjust the degree of polymerization. Generally, the phenol:formaldehyde (P/F) ratios employed ranged from approximately 1:0.5 (for three phenol repeats) up to almost equimolar (for 10 phenol repeats). The phenol was always in excess to encourage phenolic end groups on the produced oligomer.

A typical reaction involved adding both the alkyl phenol (prepared as described above) and zinc acetate (the catalyst was added at a level of approximately 10% mol of alkyl phenol) to a suitably sized single neck magnetically stirred round bottom flask. The neck of the flask was then sealed (employing a fresh rubber suba type seal each time to minimize formaldehyde loss) and the flask heated in a temperature-controlled oil bath to 40° C. with stirring. The correct volume of formaldehyde solution was then drawn up into a new disposable syringe equipped with a new fine luer needle. Once an accurate volume had been obtained, this was added to the reaction at 40° C. with stirring, and on withdrawal of the needle the seal was further augmented with the addition of vacuum grease over the puncture hole. The reaction temperature was then slowly raised to around 90° C. over the course of around 2 hours with constant stirring. At this point the reactions were seen to form intractable gels into a light colored opaque mass and stirring was stopped. Temperature was then maintained at 90° C. overnight (approx. 16 hours). At this point, the reaction was cooled. The apparatus was converted into a simple vacuum distillation set up by adding a still head to the single neck to which was directly attached a vacuum delivery tube equipped with a small round bottomed receiver flask which was externally cooled in dry ice. Vacuum was applied and the reactor temperature slowly raised to 120° C. while any distillate was collected in the cooled receiver. During this process, the gel was seen to melt and any remaining on the vessel sides was melted back into the reaction mass with a heat gun. After around three hours at this elevated temperature, the contents were a viscous clear liquid usually with a darker coloration than the parent gel.

At this stage, the product was a brittle solid at room temperature. A quantity of ethyl acetate sufficient to yield a 50% w/v solids content solution was added and the contents dissolved slowly with gentle heating and swirling. This organic solution was then washed carefully with 2 portions of deionized water of approximately equal volume to that of the organic phase. This separation was typically slow and resulted in a large amount of interface, however, the addition of saturated brine to the mixture resulted in a far better separation and much less interface.

Once suitably washed, the organic phase was dried over anhydrous magnesium sulfate, filtered and the solvent removed initially under reduced pressure on a rotary evaporator and finally under high vacuum on a vacuum line equipped with a rotary and diffusion pump until a constant mass was achieved. Masses of oligomer obtained were usually similar or slightly above that of the mass of alkyl phenol used during the reaction. The final oligomer was then sampled for GPC and $^1$H NMR.

Without allowing water to be pumped off, the reaction did not progress far beyond monomer with some small amounts of dimer and higher oligomers. However, the reaction progressed fairly rapidly once heating was increased and vacuum was applied to drive off any low boiling material (presumed to be water). This was evidenced by the GPC traces and the fact that virtually no further distillate was seen to be collected after a while.

Table 2 shows the values of oligomer length as found via GPC and by analysis of proton NMR spectra. In the case of GPC, these were statistical values calculated using narrow molecular weight standards, this and the fact that most of the oligomers molecular masses were in the region of the low molecular weight cut off of the calibration set used, it may be that proton NMR derived phenol/alkyl ratios give a better indication of true molecular weight.

TABLE 2

Oligomer length determined by GPC and $^1$H NMR

| Product | Phenol monomer | Scale | Intended repeats | Repeats found by NMR | Repeat found by GPC | Mn by GPC | Mw by GPC |
|---|---|---|---|---|---|---|---|
| 2-iso-hexyl-2-(4-hydroxy-phenyl)-propane (iHHP) | 1 | 5 g | 5 | 4-5 | 5 | 1053 | 1129 |
| para-tertiary-butylphenol (ptBP) | 2 | 5 g | 5 | 4-5 | 4 | 489 | 598 |
| para-tertiary-heptylphenol (ptHP) | 5 | 5 g | 5 | 5-6 | 5 | 895 | 1024 |

Alkoxylation Reaction

Alkoxy substitution of the phenol group of the produced oligomers was accomplished as follows.

Reactions were carried out using high vacuum sequential anionic polymerization in toluene with alkoxide quantities calculated based on the molecular weight of the alkylphenol starting material above and the PPO-PEO ratio required (in this case equimolar with approx. 4 repeats of both monomers). Potassium was employed as the counter ion for both groups with propoxylation being carried out first followed by addition of ethylene oxide under identical conditions.

The GPC data collected for the alkoxylated materials cannot be used quantitatively however, given the oligomeric nature of the products. Proton NMR provides a convenient way of estimating the relative PPO and PEO block lengths when used in combination with the spectra obtained for the unreacted oligomer.

It was assumed that the aromatic response would not change in terms of integral pre and post alkoxylation for the same oligomer. Thus if these were integrated to the same value, then is equivalent integral values for both oligomer methylene and aliphatic responses could be subtracted from the alkoxylated spectrum effectively leaving only the responses in these areas from PPO and PEO. These can then be used to determine the relative amounts of each as follows.

PPO has a —CH$_3$ response at approximately 1.2 ppm; therefore, if the value of the aliphatic integral obtained for the precursor oligomer is subtracted from the aliphatic response found in the alkoxylated equivalent (given an identical aromatic integral is set for both spectra) this residual value when divided by 3 will give an integral value per PPO proton. If the aliphatic response in the precursor oligomer spectra is divided by the relevant number of alkyl protons in that particular derivative (for example, 15 for para-tertiary-heptyl group, 9 for para-tertiary-butyl group, and 19 per 2-iso-hexyl-propane part), then this gives the integral per oligomer repeat proton. If the integral per PPO proton is then divided by that found for oligomer protons, the ratio of PPO units to oligomer repeats can be found giving the average PPO length per alkyl phenol.

Conveniently, PEO has no response in the aliphatic region with all of its —O—CH$_2$—CH$_2$ protons appearing in the range also occupied by the methylene bridge of the oligomer. Therefore, if this methylene response (calculated from the equivalent oligomer spectra) is deducted from the 3-4 ppm integral of the alkoxylated material, that which remains is a combination of 3 protons from PPO and 4 protons from PEO. If the integral value for three PPO protons (calculated from the aliphatic subtraction described above) is then also deducted from the remaining integral at 3-4 ppm and the remainder divided by 4 (4 PEG protons) this gives an integral response per PEG proton. Finally, if this value is used in combination with the integral per PPO proton found earlier from the aliphatic region above, a percentage (mol) of PEG to PPO can be found and thus a value for PEG repeats found since the average number of PPG units per phenolic repeat is already known. Applying this logic to the batches produced, the following values as shown in Table 3 were found.

TABLE 3

PPO and PEO repeats determined by $^1$H NMR

| Batch | Scale | Oligomer repeats (see Table 2) | PPO repeats | PEO repeats |
|---|---|---|---|---|
| PEO-PPO-iHHP | 5 g | 5 | 4 | 5 |
| PEO-PPO-ptBP | 5 g | 4 | 4 | 5 |
| PEO-PPO-ptHP | 5 g | 5 | 4 | 5 |

Alkoxylated Phenolic Demulsifier Formulation

The demulsifying polymers were mixed with a clarifier and a solvent in the proportions shown in Table 4.

TABLE 4

Formulation of the demulsifiers

|  | PEO5-PPO4-iHHP5 | PEO5-PPO4-ptBP4 | PEO5-PPO4-ptHP5 |
|---|---|---|---|
| Phenol | 2-iso-hexyl-2-(4-hydroxyphenyl)-propane (1) | para-tertiary-butylphenol (2) | para-tertiary-heptylphenol (5) |
| Polymer concentration | 37 w % | 37 w % | 39 w % |

TABLE 4-continued

| | Formulation of the demulsifiers | | |
|---|---|---|---|
| | PEO5-PPO4-iHHP5 | PEO5-PPO4-ptBP4 | PEO5-PPO4-ptHP5 |
| Clarifier concentration | 6 w % | 7 w % | 7 w % |
| Solvent concentration | 57 w % | 56 w % | 54 w % |

The clarifier was 1,2,4-trimethylbenzene, but naphthalene or a combination of these compounds could also be used. The solvent was a mixture of diethylene glycol (67 v %) and n-butanol (33 v %), but could also be an alcohol (such as methanol), an alkylene glycol, polyalkylene glycol, xylenes, toluene, mono-aromatics and a combination of these chemicals.

Example 2—Bottle Tests of the Emulsions

A bottle-test was performed on an emulsion made of an Arabian medium crude oil. The size of the bottle test was 100 mL. The Arabian medium crude oil used in this test had an API gravity of 28.8° and was composed of 30 wt % saturated hydrocarbons, 34 wt % aromatics, 11 wt % resins (NSO), and 25 wt % asphaltenes. The wet crude oil emulsion is highly stable up to a high temperature of 80° C. The methodology of the bottle-test was described in Raynel et al. (Oil Gas Sci. Technol.—Rev. IFP Energies Nouvelles (2021) 76:19).

Figure 1:
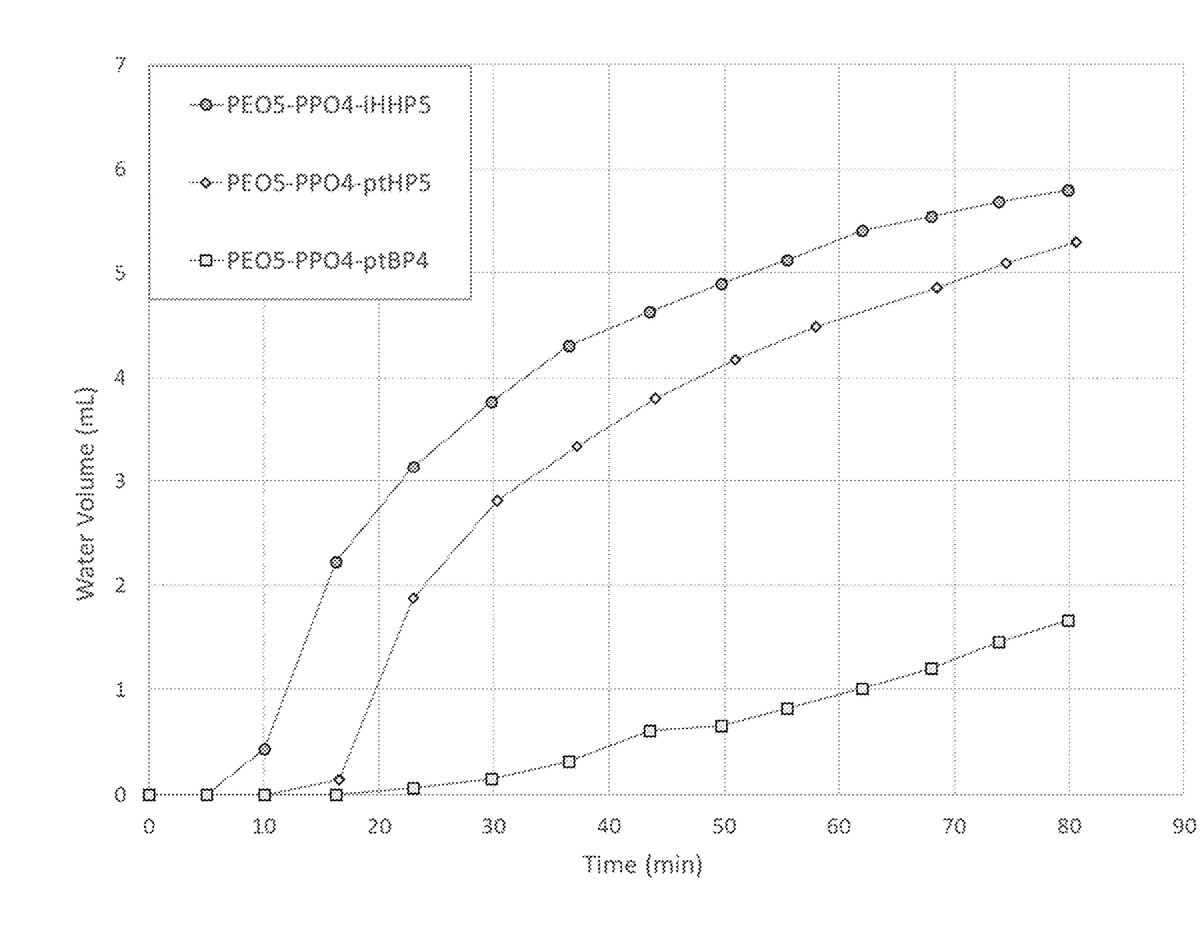
FIG. 1 is a graph showing the water separation performance at 30° C. of 50 ppm demulsifiers made from 2-iso-hexyl-2-(4-hydroxyphenyl)-propane, para-tertiary-butylphenol, and para-tertiary-heptylphenol.

The water separation performance of the various demulsifier formulations at 50 ppm and 30° C. is shown in FIG. 1. As can be seen, the combination of the iso-alkyl chain and the dimethyl of the propane segment on the formaldehyde-phenolic backbone of the PEO5-PPO4-iHHP5 demulsifier showed unexpected improvement in water separation as compared to comparative formulations that contained PEO5-PPO4-ptBP4 and PEO5-PPO4-ptHP5, as it was faster and more efficient in dewatering the wet crude oil emulsion than the comparative demulsifiers. The comparative demulsifiers had little to no effect on water separation from this emulsion as shown in FIG. 1.

What is claimed is:

1. A demulsifying polymer of Formula (I):

(I)

wherein:

PPO is polypropylene oxide having the formula:

PEO is polyethylene oxide having the formula:

x is an integer between 0 and 10;

y is an integer between 0 and 10;

m is an integer between 0 and 20; and n is an integer between 3 and 10.

2. The demulsifying polymer of claim 1, wherein x is an integer between 3 and 6.

3. The demulsifying polymer of claim 1, wherein y is an integer between 3 and 6.

4. The demulsifying polymer of claim 1, wherein the ratio of x to y is between 0.75 and 1.2.

5. The demulsifying polymer of claim 1, wherein m is an integer between 1 and 8.

6. The demulsifying polymer of claim 1, wherein m is 2.

7. The demulsifying polymer of claim 1, wherein n is an integer between 5 and 7.

8. The demulsifying polymer of claim 1, wherein:

x is an integer between 3 and 6;

y is an integer between 3 and 6;

m is an integer between 1 and 8; and n is an integer between 5 and 7.

9. The demulsifying polymer of claim 8, wherein m is 2.

10. The demulsifying polymer of claim 1, wherein the compound of Formula (I) has the structure:

11. A demulsifier composition comprising the compound of Formula (I) according to claim 1 and a solvent, a clarifier, or combination thereof.

12. A method of preparing the demulsifying polymer according to claim 1, the method comprising:

reacting phenol with an alcohol to form an alkyl phenol monomer having the structure:

reacting the alkyl phenol monomer with formaldehyde to form an oligomer having the structure:

and reacting the oligomer with PPO and PEO to form the compound of Formula (I).

13. The method of claim 12, wherein m is an integer between 1 and 8.

14. The method of claim 12, wherein m is 2.

15. The method of claim 12, wherein n is an integer between 5 and 7.

16. The method of claim 12, wherein the compound of Formula (I) has the structure:

17. The method of claim 12, further comprising mixing the compound of Formula (I) with a clarifier and a solvent to form a demulsifier composition.

18. A method of dewatering a water-in-oil emulsion, comprising adding a demulsifier composition comprising the demulsifying polymer according to claim 1 to a water-in-oil emulsion and separating the water from the emulsion.

19. The method of claim 18, wherein the water-in-oil emulsion is a crude oil emulsion.

20. The method of claim 19, wherein the crude oil emulsion is a refinery desalting emulsion.

21. The method of claim 19, wherein the crude oil emulsion is a crude oil production emulsion.

22. A method of treating produced petroleum comprising an emulsion, the method comprising contacting the produced petroleum comprising the emulsion with a demulsifier composition to reduce or eliminate the emulsion, the demulsifier composition comprising a compound of Formula (I) according to claim 1.

* * * * *